US012387317B2

(12) United States Patent
Lee et al.

(10) Patent No.: US 12,387,317 B2
(45) Date of Patent: Aug. 12, 2025

(54) ARTIFICIAL INTELLIGENCE PROCESS CONTROL FOR ASSEMBLY PROCESSES

(71) Applicant: Nanotronics Imaging, Inc., Cuyahoga Falls, OH (US)

(72) Inventors: Jonathan Lee, Brooklyn, NY (US); Anuj Doshi, Long Island City, NY (US)

(73) Assignee: Nanotronics Imaging, Inc., Cuyahoga Falls, OH (US)

(*) Notice: Subject to any disclaimer, the term of this patent is extended or adjusted under 35 U.S.C. 154(b) by 211 days.

(21) Appl. No.: 18/354,357

(22) Filed: Jul. 18, 2023

(65) Prior Publication Data

US 2024/0029239 A1    Jan. 25, 2024

Related U.S. Application Data

(60) Provisional application No. 63/368,863, filed on Jul. 19, 2022.

(51) Int. Cl.
  *G06T 7/00* (2017.01)
  *G06F 3/01* (2006.01)
  *G06V 20/40* (2022.01)

(52) U.S. Cl.
  CPC .............. *G06T 7/001* (2013.01); *G06F 3/011* (2013.01); *G06T 7/0008* (2013.01); *G06V 20/41* (2022.01); *G06T 2200/24* (2013.01); *G06T 2207/30164* (2013.01)

(58) Field of Classification Search
  CPC ... G06T 7/001; G06T 7/0008; G06T 2200/24; G06T 2207/30164; G06T 2207/20081; G06T 7/0004; G06T 2207/20084; G06F 3/011; G06V 20/41; G06V 20/52; G06V 40/20
  See application file for complete search history.

(56) References Cited

U.S. PATENT DOCUMENTS

| 2002/0128810 | A1  | 9/2002 | Craig et al. |
| 2006/0173654 | A1* | 8/2006 | Apps ...................... B65G 43/08 702/183 |

(Continued)

FOREIGN PATENT DOCUMENTS

| TW | 201917503 | 5/2019 |
| TW | 202134808 | 9/2021 |
| TW | 202223567 | 6/2022 |

OTHER PUBLICATIONS

Office Action for Taiwan Patent Application No. 112126956, dated Mar. 3, 2025, 6 pages.

(Continued)

*Primary Examiner* — Asher D Kells
(74) *Attorney, Agent, or Firm* — DLA PIPER LLP (US)

(57) ABSTRACT

A manufacturing system is disclosed herein. The manufacturing system includes a monitoring platform and an analytics platform. The monitoring platform is configured to capture data of an operator during assembly of an article of manufacture. The monitoring platform includes one or more cameras and one or more microphones. The analytics platform is in communication with the monitoring platform. The analytics platform is configured to analyze the data captured by the monitoring platform.

20 Claims, 23 Drawing Sheets

(56) References Cited

U.S. PATENT DOCUMENTS

| | | | |
|---|---|---|---|
| 2012/0062725 A1* | 3/2012 | Wampler, II | G01V 8/12 |
| | | | 348/86 |
| 2018/0246496 A1 | 8/2018 | Meier et al. | |
| 2019/0073827 A1 | 3/2019 | Coronado et al. | |
| 2020/0211413 A1* | 7/2020 | Zhang | A63H 33/042 |
| 2020/0273177 A1* | 8/2020 | Chen | G06V 20/653 |
| 2020/0278657 A1* | 9/2020 | Putman | G05B 19/4183 |
| 2020/0293019 A1* | 9/2020 | Putman | G06N 3/006 |
| 2021/0192661 A1* | 6/2021 | Delgado | G06T 19/006 |
| 2022/0066426 A1 | 3/2022 | Czinger et al. | |
| 2022/0197255 A1 | 6/2022 | Cella et al. | |
| 2023/0105603 A1* | 4/2023 | El Essaili | G05B 19/41805 |
| | | | 700/28 |

OTHER PUBLICATIONS

Office Action from TW Patent Application No. 112126956, mailed Apr. 26, 2024, 6 pages.

PCT International Application No. PCT/US23/28052, International Search Report and Written Opinion of the International Searching Authority, dated Oct. 24, 2023, 9 pages.

\* cited by examiner

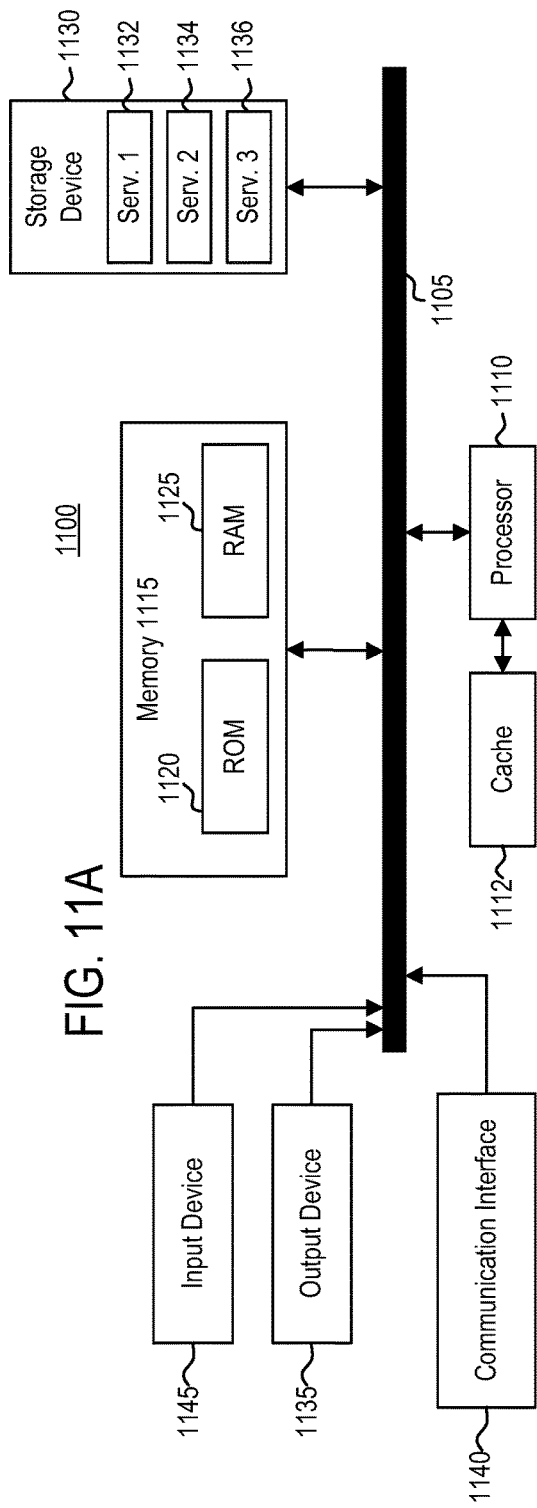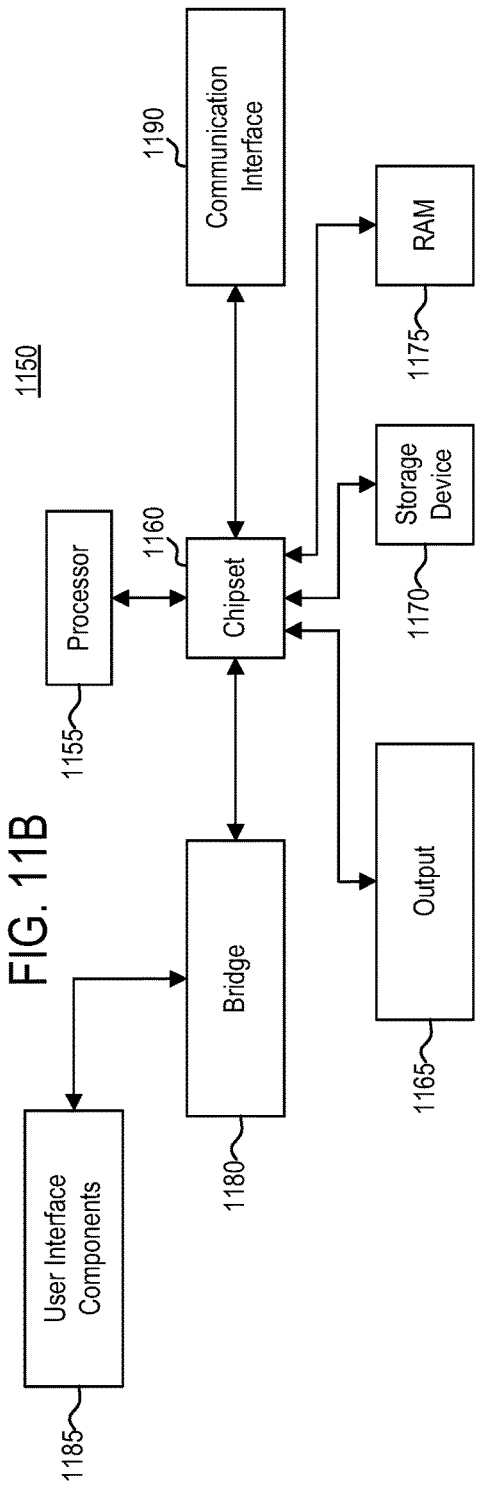

ARTIFICIAL INTELLIGENCE PROCESS CONTROL FOR ASSEMBLY PROCESSES

CROSS-REFERENCE TO RELATED APPLICATIONS

This application claims priority to U.S. Provisional Application Ser. No. 63/368,863, filed Jul. 19, 2022, which is hereby incorporated by reference in its entirety.

FIELD OF INVENTION

The present application generally relates to an object annotator and monitoring and analytics platform for generating and providing nominal assembly instructions to an actual operator and monitoring an actual operator's performance of the nominal assembly instructions.

BACKGROUND

Traditionally, in manufacturing and assembly environments, product quality is heavily dictated by the quality of workers or operators performing the manufacturing or assembly processes. Typically, much time and energy are involved in training operators to perform repeatable tasks to generate articles of manufacture. Once trained, there are few solutions to monitoring and analyzing operator performance of the assembly process.

SUMMARY

In some embodiments, a manufacturing system is disclosed herein. The manufacturing system includes a monitoring platform and an analytics platform. The monitoring platform is configured to capture data of an operator during assembly of an article of manufacture. The monitoring platform includes one or more cameras and one or more microphones. The analytics platform is in communication with the monitoring platform. The analytics platform is configured to analyze the data captured by the monitoring platform. The analytics platform configured to perform operations. The operations include receiving, from the monitoring platform, an indication of the operator performing a step in an assembly process for generating the article of manufacture. The operations further include identifying components associated with the step in the assembly process. The operations further include prompting the operator to place the components in a field of view of the one or more cameras of the monitoring platform. The operations further include receiving, from the monitoring platform, image data corresponding to the components in the field of view of the one or more cameras. The operations further include analyzing the image data to determine that the operator has selected all the components required for performing the step in the assembly process. The operations further include responsive to determining that the operator has selected all the components required for the step in the assembly process, providing nominal assembly instructions to the operator. The operations further include receiving real-time or near real-time video and audio data of the operator performing the step in the assembly process in accordance with the nominal assembly instructions. The operations further include detecting an error in the assembly process based on the real-time or near real-time video and audio data of the operator performing the step of the assembly process. The operations further include based on the detecting, prompting the operator to repair the error.

In some embodiments, a method is disclosed herein. A computing system receives, from a monitoring platform, an indication of an operator performing a step in an assembly process for generating an article of manufacture. The computing system identifies components associated with the step in the assembly process. The computing system prompts the operator to place the components in a field of view of one or more cameras of the monitoring platform. The computing system receives, from the monitoring platform, image data corresponding to the components in the field of view of the one or more cameras. The computing system analyzes the image data to determine that the operator has selected the components required for performing the step in the assembly process. Responsive to determining that the operator has selected the components required for performing the step in the assembly process, the computing system provides nominal assembly instructions to the operator. The computing system receives real-time or near real-time video and audio data of the operator performing the step in the assembly process in accordance with the nominal assembly instructions. The computing system detects an error in the assembly process based on the real-time or near real-time video and audio data of the operator performing the step of the assembly process. Based on the detecting, the computing system prompts the operator to repair the error.

In some embodiments, a non-transitory computer readable medium is disclosed herein. The non-transitory computer readable medium includes one or more sequences of instructions, which, when executed by a processor, causes a computing system to perform operations. The operations include identifying, by the computing system, components associated with a step in an assembly process for generating an article of manufacture. The operations further include prompting, by the computing system, an operator to place the components in a field of view of one or more cameras of a monitoring platform. The operations further include receiving, by the computing system from the monitoring platform, image data corresponding to the components in the field of view of the one or more cameras. The operations further include analyzing, by the computing system, the image data to determine that the operator has selected the components required for performing the step in the assembly process. The operations further include, responsive to determining that the operator has selected the components required for performing the step in the assembly process, providing, by the computing system, nominal assembly instructions to the operator. The operations further include receiving, by the computing system, real-time or near real-time video and audio data of the operator performing the step in the assembly process in accordance with the nominal assembly instructions. The operations further include detecting, by the computing system, an error in the assembly process based on the real-time or near real-time video and audio data of the operator performing the step of the assembly process. The operations further include, based on the detecting, prompting, by the computing system, the operator to repair the error.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

FIG. 11A illustrates an architecture of system bus computing system, according to example embodiments.

FIG. 11B illustrates a computer system having a chipset architecture, according to example embodiments.

DETAILED DESCRIPTION

One or more techniques disclosed herein generally relate to a monitoring and analytics platform for monitoring assembly of an article of manufacture. For example, one or more techniques disclosed herein provide a monitoring and analytics platform that allows a nominal operator to generate nominal assembly instructions to be followed by a ground truth operator performing the assembly process. The monitoring and analytics platform may be configurable between two states: a training state and an inference state. During the training state, the monitoring and analytics platform may learn an assembly process based on the operators performed and statements uttered by a nominal operator. Based on this information, the monitoring and analytics platform can generate nominal assembly instructions for the assembly process. During the inference state, the monitoring and analytics platform may instruct a ground truth operator to perform an assembly process or a step in an assembly process based on the nominal assembly instructions. Monitoring and analytics platform may monitor the ground truth operator's actions during the assembly process to ensure that the ground truth operator performed the assembly or step in the assembly in accordance with the nominal assembly instructions.

One or more techniques disclosed herein also disclose an object annotator for use with the monitoring and analytics platform. The object annotator may be used to capture images of components (e.g., parts and tools) involved in the assembly process. In some embodiments, the object annotator may be configured to dynamically capture images of the components at various angles and under various lighting conditions. In this manner, the object annotator can assist in creating a robust training set for training the monitoring and analytics platform to detect and classify objects as the ground truth operator performs the assembly process.

Figure 1A:
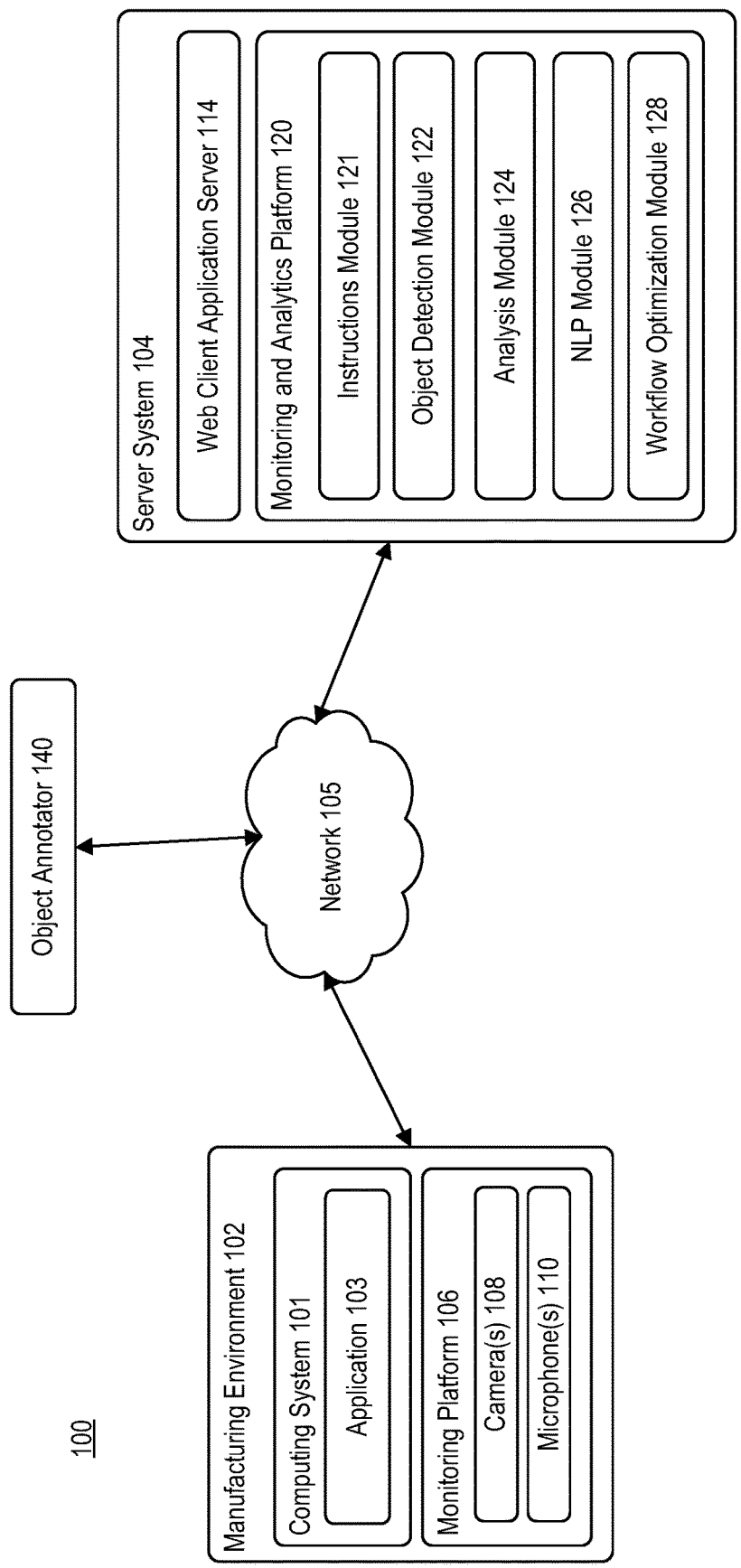
FIG. 1A is a block diagram illustrating a computing environment, according to example embodiments.

FIG. 1A is a block diagram illustrating a computing environment 100, according to example embodiments. As shown, computing environment 100 may include manufacturing environment 102 and server system 104 communication via network 105. Although manufacturing environment 102 and server system 104 communicate via network 105, that does not preclude manufacturing environment 102 and server system 104 being co-located in the same physical location. For example, server system 104 may exist within manufacturing environment 102.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receive information between the components of computing environment 100.

Manufacturing environment 102 may be representative of a manufacturing environment in which a human operator performs at least one step in an assembly process. For example, manufacturing environment may be representative of an assembly line process, during which an article of manufacture undergoes multiple stops or steps along the assembly line before becoming fully assembled. In such environments, at least one human operator may be performing the processes or actions upon the article of manufacture at each step along the assembly line process. In some embodiments, there may be multiple human operators along the assembly line process, with each of the multiple human operators performing at least one step of the assembly process.

Manufacturing environment 102 may include one or more computing systems 101 and a monitoring platform 106 in communication with one or more computing systems 101. Monitoring platform 106 may be configured to monitor operations of a given operator or operators at a single station or across multiple stations. Monitoring platform 106 may include one or more cameras 108 and one or more microphones 110. Each camera 108 may be configured to capture image and/or video data of an operator performing one or more actions on an article of manufacture. Similarly, each microphone 110 may be configured to capture audio data of an operator performing one or more actions on the article of manufacture. The image and/or video data captured by cameras 108 and the audio data captured by microphones 110 may be sent to server system 104 for analysis.

In some embodiments, one or more computing systems 101 may include application 103 executing thereon. Application 103 may be representative of an application associated with server system 104. In some embodiments, application 103 may be a standalone application associated with server system 104. In some embodiments, application 103 may be representative of a web browser configured to communicate with server system 104. In some embodiments, one or more computing systems 101 may communicate over network 105 to request a webpage, for example, from web client application server 114 of server system 104. In some embodiments, one or more computing systems 101 may be configured to execute application 103 to generate nominal assembly instructions for an assembly process. In some embodiments, one or more computing systems 101 may be configured to execute application 103 for providing nominal assembly instructions to an actual operator and monitoring the assembly step or steps performed by the actual operator.

Server system 104 may be in communication with components of manufacturing environment 102. Server system 104 may include a web client application server 114 and monitoring and analytics platform 120. Monitoring and analytics platform 120 may be configured to deliver assembly instructions to human operators, analyze actions performed by the human operators in manufacturing environment 102 to ensure that the human operator performed the actions correctly and in an efficient manner, and optimize, improve, or adjust the assembly instructions of the assembly process based on the analysis.

Monitoring and analytics platform 120 may include at least instructions module 121, object detection module 122, analysis module 124, natural language processing (NLP) module 126, and workflow optimization module 128. Each of instructions module 121, object detection module 122, analysis module 124, NLP module 126, and workflow optimization module 128 may be comprised of one or more software modules. The one or more software modules are collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Instructions module 121 may be configured to provide ground operators with assembly instructions in real-time or near real-time. The assembly instructions may take the form of audio instructions, image instructions, video instructions, written instructions, or any combination thereof. Generally, the instructions provided to the operator may be interactive in nature, such that the operator can be guided through their step of the assembly process.

The assembly instructions provided to the operators from instructions module 121 may be considered the nominal assembly instructions. Nominal assembly instructions may ensure uniform assembly of articles of manufacture independent of the operator. In some embodiments, the nominal assembly instructions may be the same instructions that analysis module 124 may be trained upon. For example, as will be discussed in more detail below, when analysis module 124 analyzes the operator's assembly of an article of manufacture, analysis module 124 may compare the operator's actions to the nominal assembly instructions to determine whether the operator's assembly of an article of manufacture deviates from the nominal assembly instructions.

In some embodiments, instructions module 121 may provide the assembly instructions to the operator in a step-wise manner. For example, the nominal assembly instructions may include a plurality of steps, with each step having individual assembly instructions. In some embodiments, instructions module 121 may not provide the operator assembly instructions for a following step until the operator's assembly in the present step is reviewed and analyzed by object detection module 122 and/or analysis module 124. If, for example, there are errors in the operator's assembly of the article of manufacture, instructions module 121 may provide the operator with corrective actions or instructions generated by analysis module 124.

In some embodiments, instructions module 121 may assist nominal operator in generated nominal assembly instructions to be provided to an actual operator. For example, as indicated above, and described below in more detail, monitoring platform 106 may be configured to capture audio and/or video data of the nominal operator performing an assembly process or a step in the assembly process. The actions and statements uttered by the nominal operator that are captured by monitoring platform 106 may form the basis on the nominal assembly instructions.

Object detection module 122 may be configured to detect objects within a field of view of a camera 108. In some embodiments, object detection module 122 may utilize a deep learning based image processing model that is trained to identify and/or extract objects from video and/or image data obtained by monitoring platform 106. For example, object detection module 122 may be trained to identify objects within a field-of-view of one or more cameras 108 of monitoring platform 106. By identifying objects within the field-of-view of one or more cameras 108, monitoring and analytics platform 120 may ensure that the operator for a given step in the assembly process has utilized the correct tools and has assembled the necessary components at the given step.

Analysis module 124 may be configured to analyze motion data of the operator and/or image data of the article of manufacture to determine whether the operator has deviated from the assembly instructions. For example, analysis module 124 may be trained to ensure uniform assembly of articles of manufacture independent of the human operator or other influencing factors (e.g., shift, ambient conditions, raw materials, etc.) using nominal assembly instructions as the basis for analysis.

In some embodiments, such as when analysis module 124 may be deployed, analysis module 124 may provide the operator with instructions in real-time or near real-time based on one or more of the detected objects, an analysis of the motion data of the operator compared to the nominal assembly instructions, and/or an analysis of image data of the article of manufacture compared to image data of a nominal article of manufacture.

In some embodiments, analysis module 124 may work with object detection module 122 to determine whether the operator is using all the correct objects (e.g., components, parts, tools, etc.) during assembly of the article of manufacture. For example, in some embodiments, analysis module 124 may determine that a step requires five distinct parts, and the operator only has four distinct parts within the field of view of cameras 108. In such examples, analysis module 124 may notify the operator that a part is missing. In some embodiments, when analysis module 124 determines that a part is missing, analysis module 124 may notify the operator of the specific part that is determined to be missing.

In another example, analysis module 124 may determine that a step requires five distinct parts, that the operator has five distinct parts, but that one of the parts is not correct (e.g., machine screws instead of sheet metal screws). In such examples, analysis module 124 may notify the operator that one of the five distinct parts is incorrect and that a specific part should be used instead.

In another example, analysis module 124 may notify the operator that a tool being utilized is incorrect. For example, analysis module 124 may determine that the operator picked up an imperial hex key when the assembly instructions called for a metric hex key. Accordingly, analysis module 124 may leverage object detection module 122 to ensure that the operator is following the nominal assembly instructions.

In some embodiments, analysis module 124 may be configured to monitor the assembly time during the assembly process. For example, in addition to monitoring and analyzing the actual assembly of an article of manufacture to ensure that the operator's processes follow the nominal assembly instructions, analysis module 124 may log the time it took for the operator to complete his or her processes. In some embodiments, analysis module 124 may log the time it took to complete each step of the assembly process, as well as the total time of assembly. Such information may be used, for example, to evaluate the assembler and/or cause the assembly instructions to be reevaluated.

In some embodiments, analysis module 124 may be configured to monitor any idle time during the assembly process. In some embodiments, idle time may refer to a period of time during which there is no activity within the field of view of cameras 108. For example, the operator may be on a schedule break, and unscheduled break, or otherwise away from the workstation. In some embodiments, idle time may refer to time when the operator is present but not working. Analysis module 124 may log each operator's idle time. Such information may be used, for example, to evaluate the assembly and/or cause the assembly instructions to be reevaluated.

In some embodiments, analysis module 124 may be configured to monitor a range-of-motion of the operator during the assembly process. In some embodiments, the range of motion may represent the accumulated distance the operator achieved during the assembly process. In some embodiments, the range of motion may represent the accumulated distance the operator's hands achieved during the assembly process. Such information may be used, for example, to evaluate the assembly and/or cause the assembly instructions to be reevaluated.

In some embodiments, analysis module 124 may be configured to monitor oculomotor parameters of the operator based on the image and/or video data provided by cameras 108. Oculomotor parameters may include, but are not limited to, one or more of blink duration, delay of eyelid reopening, blink interval, or standardized lid closure speed. Such parameters may indicate assembler fatigue. Such information may be used, for example, to evaluate the assembly and/or cause the assembly instructions to be reevaluated.

NLP module 126 may be configured to receive and process verbal commands from operators. For example, during the assembly process, the operator may have a question regarding the assembly instructions or the current state of the article of manufacture. NLP module 126 may allow an operator to ask questions in real-time or near real-time. For example, NLP module 126 may receive input in the form of an audio signal from microphones 110. NLP module 126 may convert the audio to a text-based representation. Based on the text-based representation, NLP module 126 may digest and understand the operator's question, such that a response can be generated and provided to the operator. In this manner, monitoring and analytics platform 120 may provide operators with assistance in real-time or near real-time.

In some embodiments, based on the natural language processing techniques, NLP module 126 may generate highlights for the nominal assembly instructions. Highlights may correspond to important points or tips to be provided to the actual operator during performance of the nominal assembly instructions. For example, highlights may be based on statements uttered by the nominal operator during recording of the assembly process.

Workflow optimization module 128 may be configured to improve or optimize the nominal assembly instructions based on analysis performed by analysis module 124. In some embodiments, based on information generated by analysis module 124, workflow optimization module 128 may be configured to create an efficiency metric. In some embodiments, workflow optimization module 128 may be configured to create an efficiency metric for each operator involved in the assembly process. In some embodiments, workflow optimization module 128 may be configured to generate an efficiency metric for each step in the assembly process. In some embodiments, workflow optimization module 128 may be configured to generate an efficiency metric for the entire assembly process.

Based on the efficiency metrics, workflow optimization module 128 may generate recommended changes to the assembly process. In some embodiments, a recommended change may include a recommended personnel change for a specific assembly step. For example, workflow optimization module 128 may recommend that Operator A be swapped out for Operator B at Step Two of the assembly process. In some embodiments, a recommended change may include a recommended change to the assembly instructions or the workflow. For example, workflow optimization module 128 may recommend staging of upcoming parts for an assembly or may recommend a change to the order of manufacture.

In some embodiments, workflow optimization module 128 may include a machine learning model trained to generate efficiency metrics from the efficiency parameters generated by analysis module 124. For example, based on a combination of one or more of accuracy is following the assembly process, assembly time, range of motion, and/or idle time, workflow optimization module 128 may generate efficiency metrics at the operator level and at the assembly level. In some embodiments, the machine learning model of workflow optimization module 128 may be trained to generate the aforementioned recommended changes to the assembly process.

In some embodiments, computing environment 100 may include object annotator 140. Although object annotator 140 is shown separate from manufacturing environment 102, those skilled in the art understand that object annotator 140 may exist in manufacturing environment 102. Object annotator 140 may be configured to assist monitoring and analytics platform 120 in training machine learning model 212 to identify components during the assembly process. Object annotator 140 may include one or more cameras and a lighting system. The cameras and lighting system of object annotator 140 may work in conjunction to capture a component (e.g., a part or tool) from various angles under various lighting conditions. In this manner, when object detection module 122 is deployed, object detection module 122 may be better equipped to identify and classify each component regardless of the lighting conditions or positioning relative to cameras 108.

In some embodiments, the cameras of object annotator 140 may be rotated over different planes of the object of interest. During this motion, the camera's position and orientation with respect to the center of the tool are noted and images are captured at desired increments of the position. The lighting conditioning may be constantly changed by a lighting algorithm. In some embodiments, the lighting algorithm may try to capture the object in many contrasting states to get maximum details about the objects in a robust manner. In some embodiments, the details about the objects may be pushed to a background subtraction and blending algorithm. The background subtraction algorithm may isolate the object of interest; the blending pipelines may project it at different translations, rotations and lighting conditions as per the actual object detection setup (actual deployment scene). Since the entire process can be automated, all that a user needs to do is give the label for each set of images captured. The blending pipeline may further include a dataset and may handle data augmentation on the dataset as needed.

Figure 1B:
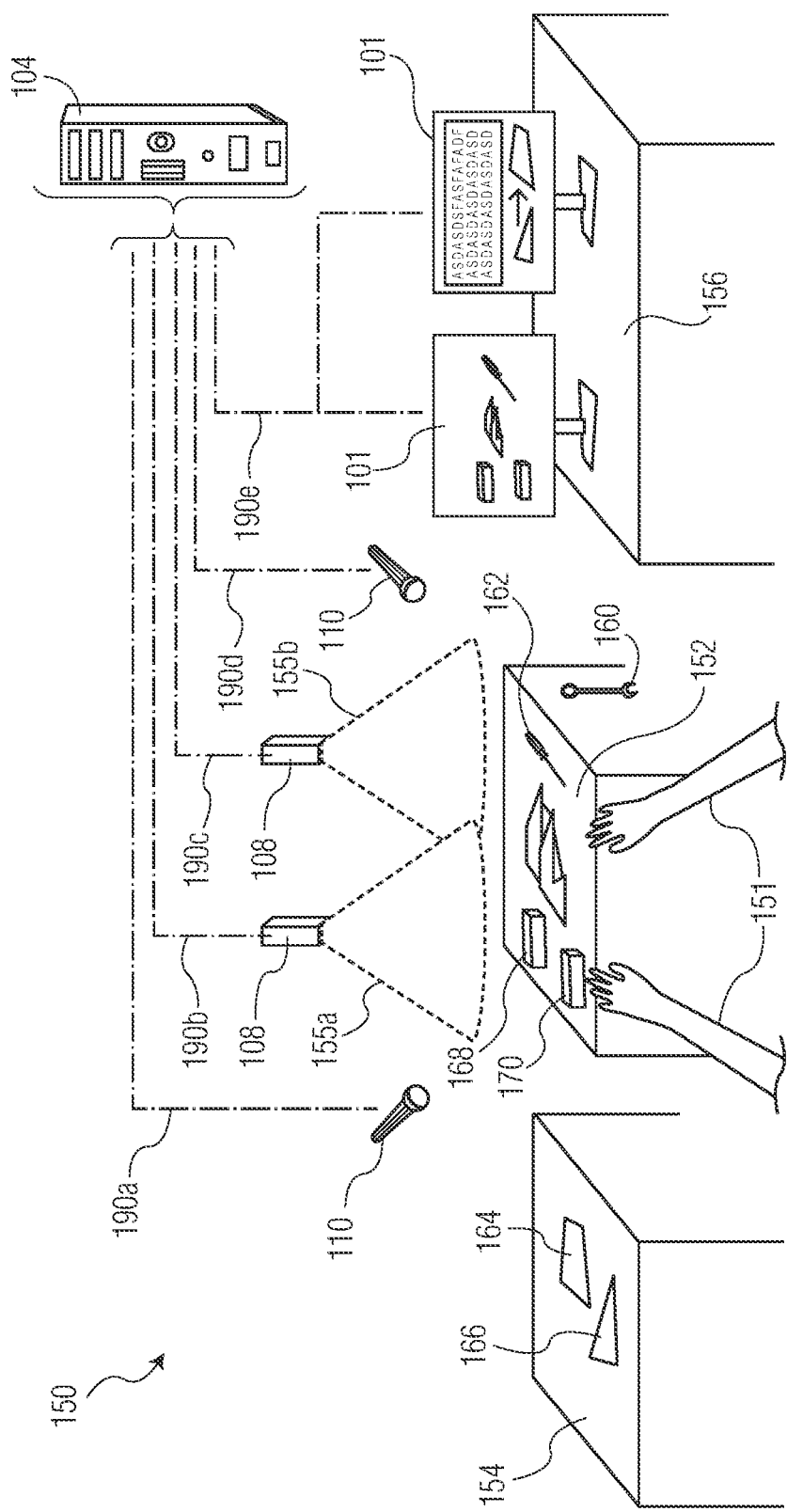
FIG. 1B is a block diagram illustrating a workspace, according to example embodiments.

FIG. 1B is a block diagram illustrating a workspace 150, according to example embodiments. In some embodiments, workspace 150 may be representative of manufacturing environment. For example, as show, workspace 150 may include at least a workstation 152, monitoring platform 106, and one or more computing systems 101. Further, in some embodiments, such as that shown in FIG. 1B, workspace 150 may further include a parts station 154 and an instruction station 156.

Workstation 152 may be representative of a workstation upon with an operator 151 performs a step in the assembly process. For example, as shown, workstation 152 may have a plurality of components placed thereon. The plurality of components may include, for example, a tool 160, a tool 162, a part 164, and a part 166. In some embodiments, the plurality of components may include containers for the parts, such as container 168 and container 170. Monitoring platform 106 may be configured to focus on workstation 152. For example, cameras 108 may be directed towards workstation 152, such that cameras 108 can capture image and video data of operator 151 performing a step in the assembly process. As shown, cameras 108 may have field of views 155a and 155b that encompass workstation 152. Similarly, microphones 110 may be directed towards workstation 152 such that microphones 110 can capture audio data of operator 151 performing a step in the assembly process.

In some embodiments, parts station 154 may be configured to support the components associated with the assembly process. In some embodiments, parts station 154 may support all components associated with the assembly process. In some embodiments, parts station 154 may be configured to support components associated with a given step in the assembly process.

In some embodiments, instruction station 156 may be configured to provide instructions to operator 151 to follow during the assembly process. As shown, instruction station 156 may support one or more computing systems 101. Computing systems 101 may receive nominal assembly instructions for the assembly process or a step in the assembly process from server system 104. Computing systems 101 may present the nominal assembly instructions to operator 151 to follow. In some embodiments, computing systems 101 may further display various graphical user interfaces associated with application 103, such as GUIs 700-770 and GUIs 800-830, described below in conjunction with FIGS. 7A-7F and FIGS. 8A-8E.

As shown, components of workspace 150 may be in communication with server system 104 via one or more communication links 190a-190e. In some embodiments, communication links 190a-190e may be representative of one or more wired or wireless networks, such as, but not limited to RS232, ethernet, Bluetooth, Zigbee, and the like.

Further, although workspace 150 and server system 104 are shown as existing in the same environment, those skilled in the art understand that server system 104 may be remote from workspace 150.

Figure 2:
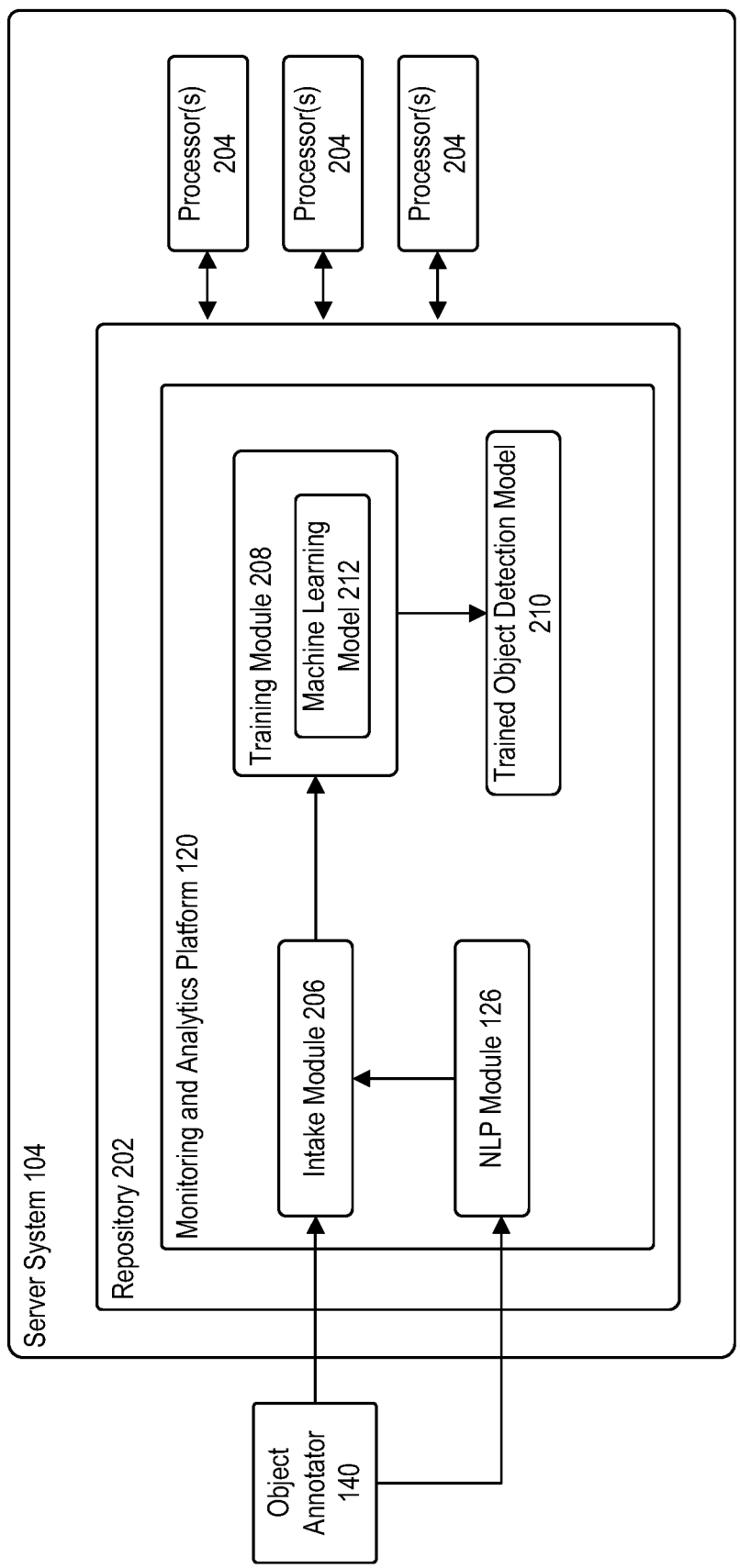
FIG. 2 is a block diagram illustrating a server system, according to example embodiments.

FIG. 2 is a block diagram illustrating server system 104, according to example embodiments. As shown, server system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least monitoring and analytics platform 120.

Monitoring and analytics platform 120 may include an intake module 206, training module 208, and trained object detection model 210. Each of intake module 206 and training module 208 may be comprised of one or more software modules. The one or more software modules are collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As shown, during training, monitoring and analytics platform 120 may communicate with an object annotator 140. Intake module 206 may be configured to receive a plurality of images of a plurality of components from object annotator 140. Although FIG. 2 illustrates direct communication between intake module 206 and object annotator 140, those skilled in the art understand, that intake module 206 may instead communicate with a storage location that includes the plurality of images of a plurality of components captured using object annotator 140. Once intake module 206 receives or identifies the plurality of images of the plurality of components, intake module 206 may generate one or more training data sets for training machine learning model 212. In some embodiments, intake module 206 may perform one or more pre-processing operations on the plurality of images to generate the training data set.

In some embodiments, intake module 206 may further be configured to receive descriptive data associated with the plurality of images of the plurality of components. In some embodiments, intake module 206 may receive text-based descriptions of the plurality of components from a computing system associated with object annotator 140. In some embodiments, intake module 206 may receive text-based descriptions of the plurality of components generated by NLP module 126. For example, while the operator scans a component using object annotator 140, the operator may audibly describe the component, which may be captured by microphones 110 and converted to a text-based representation for analysis by NLP module 126.

Training module 208 may be configured to train machine learning model 212 to identify and classify components based on the training data set. For example, training module 208 may be configured to train machine learning model 212 to identify and classify components during an assembly process based on the plurality of images generated by object annotator 140. In some embodiments, training module 208 may be configured to train machine learning model 212 to identify and classify components during an assembly process based on the plurality of images generated by object annotator 140 and the descriptive data associated with the plurality of images.

As output, training module 208 may generate an object detection model 210 for use in object detection module 122. When deployed, object detection module 122 may use object detection model 210 to identify and classify components during the assembly process.

In some embodiments, there may be a trained object detection model 210 for each type of assembly. For example, the foregoing process may be repeated for each assembly or sub-assembly type. Thus, object detection module 122 may have access to a suite of trained object detection models for a plurality of assembly types.

Figure 3:
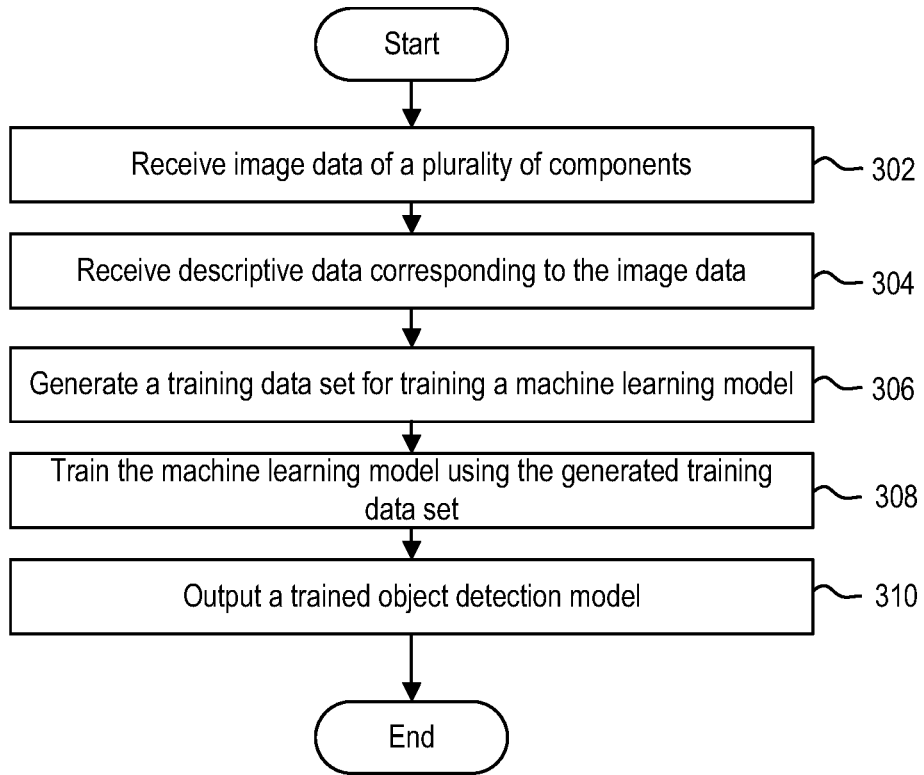
FIG. 3 illustrates an exemplary avatar, according to example embodiments.

FIG. 3 is a flow diagram illustrating a method 300 of training an object detection model for use in object detection module 122, according to example embodiments. Method 300 may begin at step 302.

At step 302, server system 104 may receive image data of a plurality of components associated with an assembly process. In some embodiments, server system 104 may receive the image data from object annotator 140. In some embodiments, server system 104 may receive the image data from a storage location associated with object annotator 140. The image data may include a plurality of images of a plurality of components. In some embodiments, for each component (e.g., tool, part, etc.), server system 104 may receive a plurality of images. For example, for each component, object annotator 140 may capture a plurality of images from a plurality of different positions or angles under a plurality of different lighting scenarios.

At step 304, server system 104 may receive descriptive data corresponding to the image data. In some embodiments, server system 104 may receive the descriptive data from a computing system associated with object annotator 140. For example, as part of the scanning process using object annotator 140, an operator or user may add descriptive information that describes the part to be imaged via the computing system. In some embodiments, the descriptive information may be received via NLP module 126.

At step 306, server system 104 may generate a training data set for training a machine learning model of object detection module 122. For example, intake module 206 may generate a training data set that includes the plurality of images of the plurality of components and the associated descriptive information.

At step 308, server system 104 may train the machine learning model using the generated training data set. For example, training module 208 may train machine learning model 212 to identify and classify components (e.g., parts, tools, etc.) using the training data set. In some embodiments, training module 208 may train machine learning model 212 to identify and classify components from image data alone. In some embodiments, training module 208 may train machine learning model 212 to identify and classify components from the descriptive data alone. In some embodiments, training module 208 may train machine learning model 212 to identify and classify components form image and descriptive data.

At step 310, server system 104 may output a trained object detection model 210 based on the training. Server system 104 may deploy trained object detection model 210 as part of object detection module 122.

Figure 4:
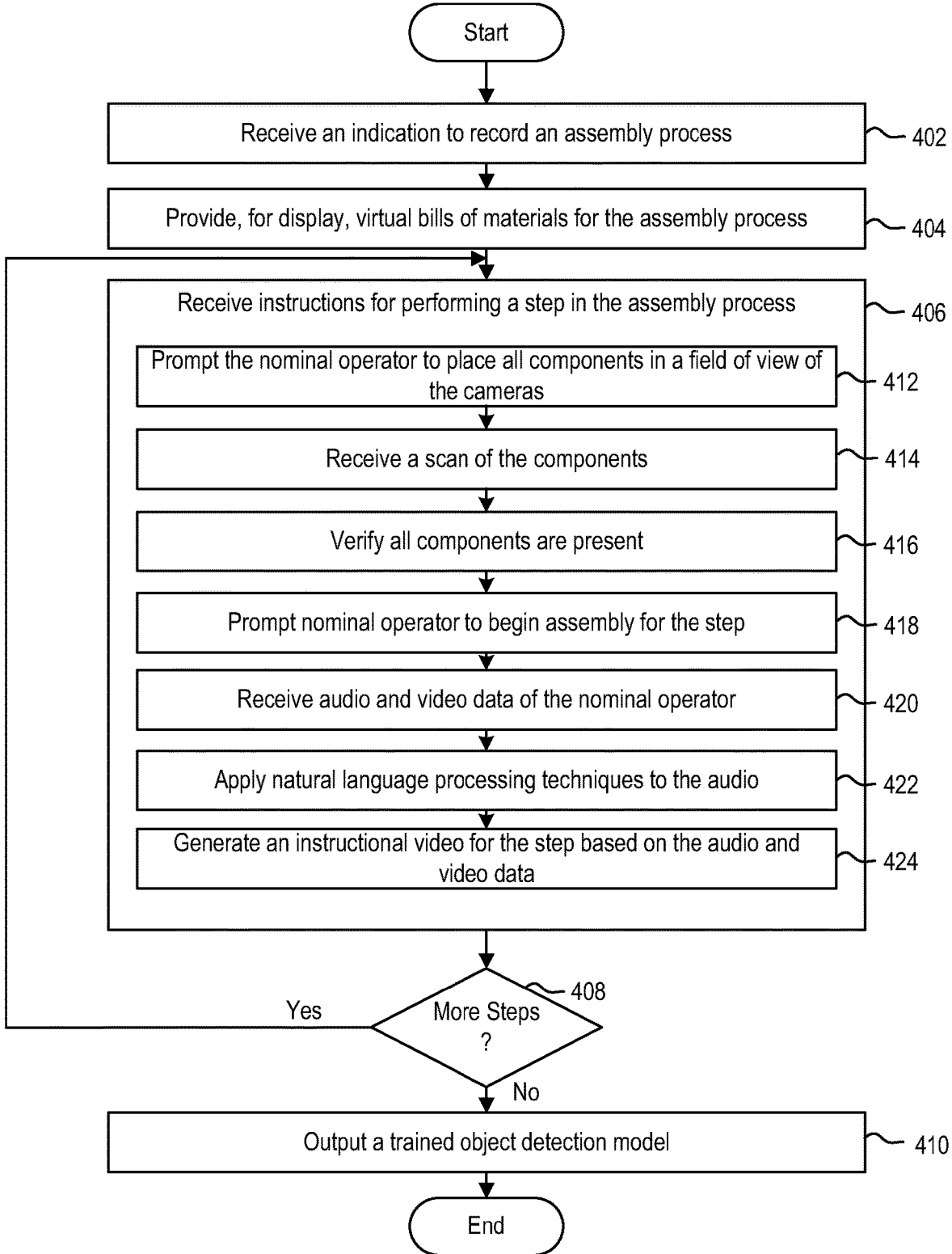
FIG. 4 is a flow diagram illustrating a method of generating nominal assembly instructions for an assembly process, accordingly to example embodiments.

FIG. 4 is a flow diagram illustrating a method 400 of generating nominal assembly instructions for an assembly process, accordingly to example embodiments. Method 400 may begin at step 402.

At step 402, server system 104 may receive an indication to record an assembly process from monitoring platform 106. For example, a nominal operator may launch an application on a computing system associated with monitoring platform 106. Application may be in communication with server system 104. Via the application, the nominal operator may indicate one or more parameters associated with the assembly process. For example, via the application, the nominal operator may indicate the assembly's name, the model path or object detection model type (e.g., the assembly an object detection model 210 is trained upon for the assembly the operator is working on), and/or subassembly details. In some embodiments, different assemblies (e.g., sub-assemblies) may be associated together as parts of a larger assembly. For example, an operator may wish to assemble a mechatronics component—ASSEM XYZ. For ASSEM XYZ, the operator may need Part A, Part B, Part C and electrical assemblies EA100, EA200, EA300. The operator may directly add EA100, EA200, EA300 instead of adding all individual components from EA100, EA200, EA300. In some embodiments, the operator can optionally view instruction videos, bill of material, and all information related to EA100, EA200, EA300.

At step 404, server system 104 may provide, for display to the nominal operator, virtual bills of materials for the indicated assembly process. For example, based on the parameters uploaded by the nominal operator, server system 104 may identify the bills of materials associated with the assembly based on the plurality of images of the plurality of components and metadata associated therewith, uploaded via object annotator 140. In some embodiments, server system 104 may generate a graphical user interface that includes the virtual bills of materials corresponding to the plurality of components associated with the indicated assembly process. Server system 104 may cause the graphical user interface to be displayed via a computing system or computing device within manufacturing environment 102. In this manner, a nominal operator or a future operator may view all the components associated with the assembly process prior to beginning.

At step 406, server system 104 may receive, for each n-steps of the assembly process, instructions for performing each corresponding step. Step 406 includes sub-steps 412-424. Step 406 may be repeated for each of the n-steps in the assembly process.

At sub-step 412, server system 104 may prompt the nominal operator to place all components for the current step within a field of view of cameras 108. For example, server system 104 may provide a message, to be displayed via computing system 101, that prompts that nominal operator to perform this step. In some embodiments, the components requested may include the parts for the step as well as any tools required for performing the step. Generally, the area at which the nominal operator is prompted to place the components is on the workspace.

At sub-step 414, server system 104 may receive a scan of the components the nominal operator placed on the workspace. For example, cameras 108 may capture one or more images of the workspace and the components placed by the nominal operator on the workspace. Cameras 108 may transmit the one or more images to server system 104 for analysis.

At sub-step 416, server system 104 may verify that all components required for the current step are present. For example, object detection module 122 may utilize object detection model to analyze the image data, detect the components in the one or more images, and classify each of the components in the one or more images. Object detection model may utilize the learned information based on the images received from object annotator 140.

At sub-step 418, server system 104 may prompt nominal operator to begin the assembly process for the current step. For example, server system 104 may provide a message, to be displayed via computing system 101, that prompts that nominal operator to begin the assembly step. In some embodiments, server system 104 prompting the nominal operator to being the assembly process for the current step may include activating one or more cameras 108 and/or one or more microphones 110 to record the nominal operator during the assembly.

At sub-step 420, server system 104 may receive audio and video data of the nominal operator performing the current step. For example, the nominal operator may perform the step of the assembly process as if they were teaching another operator how to perform the step of the assembly process. In some embodiments, this may involve the nominal operator describing every action that they are performing, such as, but not limited to which component the nominal operator is currently interacting with, how to orient the component, how to combine two components, which tool(s) to use for combining the two components, and the like. In some embodiments, the nominal operator may audible recite tips or best practices for performing the assembly process. An example tip or best practice may be, for example, not to over tighten a screw at this step of the assembly process.

At sub-step 422, server system 104 may apply natural language processing techniques to the audio to understand the nominal operator's assembly. For example, NLP module 126 may receive the audio data of the assembly step, convert the audio data to text based representations, and may analyze the text based representation of the audio data. NLP module 126 may use the text based representation of the audio data to understand the importance of certain sentences and sentiments of the nominal operator. In some embodiments, NLP module 126 may use the text based representations in order to categorize portions of the assembly process into different highlights. For example, based on one or more of operator sentiment, words used, positional encoding of words and different parts of speech, named entity recognition, and tone, NLP module 126 may be trained to understand what category a sentence belongs to (e.g., gibberish, assembly instruction, personal statement, critical/warning). Based on the detected category, NLP module 126 may take different actions. In some embodiments, based on categorizing a statement or utterance as a gibberish sentence, NLP module 126 may discard that statement or utterance. In some embodiments, based on categorizing a statement or utterance as an assembly instruction, NLP module 126 may use the statement or utterance to create nominal assembly instructions for the actual assembler. In some embodiments, based on categorizing a statement or utterance as a personal statement, NLP module 126 may use the statement or utterance as prompts for the actual assembler. For example, the prompts may take the form of subtitles or warnings that may be shown in large bright fonts symbols signaling danger to the actual assembler. In this manner, NLP module 126 may utilize the audio data to filter the information into highlights for assemblies.

At sub-step 424, server system 104 may generate nominal assembly instructions for the current step based on the audio and video data. For example, based on the video captured for the step and the highlights, instructions module 121 and/or NLP module 126 may work in conjunction to generate a final video. In some embodiments, creating a final video may include NLP module 126 removing gibberish sentences from the audio data. NLP module 126 may then send all the other sentences or utterances to instructions module 121, which may include a text-to-speech model that reads those sentences at appropriate timestamps and generates an audio file. Instructions module 121 may add this audio file is added to the step video file, overwriting original audio, to create a final multimedia video for the step that will be shown to the actual operator as part of the nominal assembly instructions. In some embodiments, instructions module 121 may generate the nominal assembly instructions by synchronizing the video data with the audio data using one or more machine learning algorithms configured to classify and track the position and location of each part or tool used in the assembly. For example, instructions module 121 may involve NLP module 126 to convert the audio data to a text-based representation using one or more speech-to-text based algorithms. Instructions module 121 may use information, such as verbal descriptions about the current parts in use and object classification data, to synchronize the audio data with the video data. In some embodiments, the nominal assembly instructions may take the form of video instructions, audio instructions, visual instructions, text-based instructions, and/or any combination thereof.

In some embodiments, instructions module 121 may synchronize the video data and audio data using a fast Fourier transform cross correlation (FFTCR) to get the best match in audio in two videos. The process may be repeated for a third video. For example, instructions module 121 may perform one or more operations, which may include, loading audio one from video one, loading audio two from video two, checking if sampling rates are different/same, taking a patch from audio one and find FFTCR across audio two, finding the peak of correlation (e.g., the point where the audio signal is same and strongest in both files), checking the same for audio two in audio one, selecting the stronger peak, if the peak is over a certain threshold, the starting point else may print "good match not found," the peak may be the point in time when the later audio was started in the first audio, receiving the video frames per second, trimming the first video until the frames per second multiplied by the peak time (e.g., cropping the initial part of the video that started first and brings it to the point where the second one starts).

Once the sub-steps for a given step in the assembly process are complete, method 400 may proceed to step 408. At step 408, server system 104 may determine if there are more steps in the assembly process. If, at step 408, server system 104 determines that there are more steps in the assembly process, then method 400 may revert to step 406, and instructions for performing another step are received.

If, however, at step 408, server system 104 determines that there are no more steps in the assembly process, then method 400 may proceed to step 410. At step 410, server system 104 may save the generated nominal assembly instructions for each step of the assembly process in a network accessible location for subsequent deployment.

Figure 5:
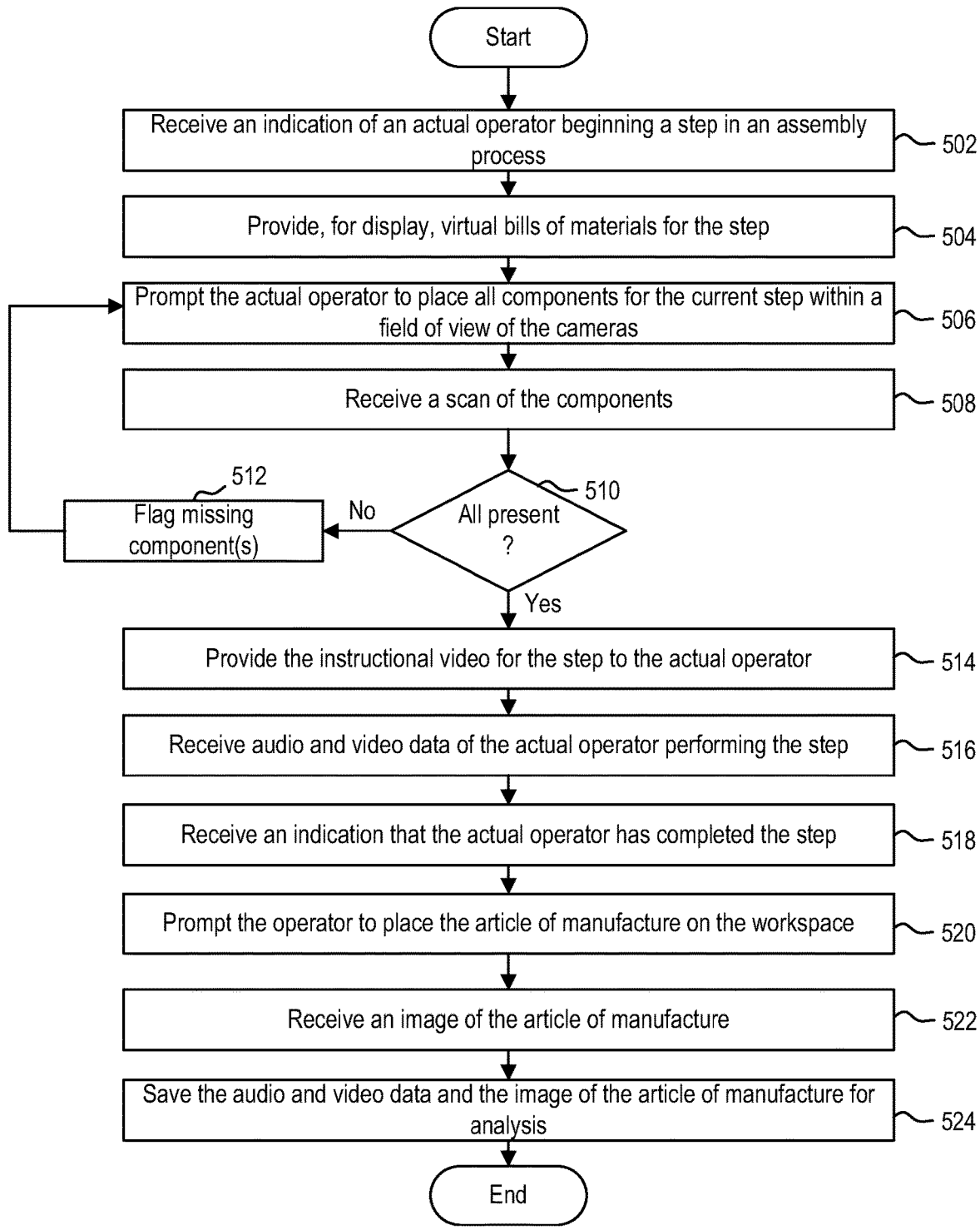
FIG. 5 is a flow diagram illustrating a method of monitoring an operator during an assembly process, according to example embodiments.

FIG. 5 is a flow diagram illustrating a method 500 of monitoring an operator during an assembly process, according to example embodiments. Method 500 may begin at step 502.

At step 502, server system 104 may receive an indication of an actual operator beginning a step in an assembly process from monitoring platform 106. For example, an actual operator may launch an application on a computing system associated with monitoring platform 106. Application may be in communication with server system 104. Via the application, the actual operator may provide an indication of the assembly process and the step in the assembly process to which the actual operator is assigned. For example, via the application, the actual operator may indicate the assembly's name and/or the step assigned to the actual operator.

At step 504, server system 104 may provide, for display to the actual operator, virtual bills of materials for the indicated step in the assembly process. For example, based on the parameters uploaded by the actual operator, server system 104 may identify the bills of materials associated with the assembly process. In some embodiments, server system 104 may generate a graphical user interface that includes the virtual bills of materials corresponding to the plurality of components associated with the indicated step. Server system 104 may cause the graphical user interface to be displayed via a computing system or computing device within manufacturing environment 102. In this manner, the actual operator may view all the components associated with the assembly step prior to beginning.

At step 506, server system 104 may prompt the actual operator to place all components for the current step within a field of view of cameras 108. For example, server system 104 may provide a message, to be displayed via computing system 101, that prompts that actual operator to perform this step. In some embodiments, the components requested may include the parts for the step as well as any tools required for performing the step. Generally, the area at which the nominal operator is prompted to place the components is on the workspace.

At step 508, server system 104 may receive a scan of the components the actual operator placed on the workspace. For example, cameras 108 may capture one or more images of the workspace and the components placed by the actual operator on the workspace. Cameras 108 may transmit the one or more images to server system 104 for analysis.

At step 510, server system 104 may analyze the images to verify that all components required for the current step are present. For example, object detection module 122 may utilize object detection model to analyze the image data, detect the components in the one or more images, and classify each of the components in the one or more images. Object detection module 122 may compare the classified components to the nominal instructions generated by the nominal operator, such as that described above in conjunction with FIG. 4.

If, at step 510, server system 104 determines that a component is missing, then method 500 may proceed to step 512. At step 512, server system 104 may flag the missing component to the actual operator. In some embodiments, flagging the missing components to the actual operator may include providing an indication to be displayed via computing system 101. In some embodiments, flagging the missing components may including highlighting or annotating the components. For example, server system 104 may annotate the display of the components on computing system 101. In some embodiments, those components that have been correctly selected may be annotated with a green highlight or bounding box. In some embodiments, those components that have been incorrectly selected may be annotated with a red highlight or bounding box. In this manner, server system 104 may notify the actual operator which components are correct and which components are incorrect or missing. Following step 512, method 500 may revert to step 506, and the operator may be re-prompted to place all components for the current step within a field of view of cameras 108.

If, however, at step 510, server system 104 determines that all components required for the step are present, then method 500 may proceed to step 514. At step 514, server system 104 may provide the nominal assembly instructions for the step to the actual operator. For example, server system 104 may cause computing system 101 to display the nominal assembly instructions for the step to the actual operator. In some embodiments, the nominal assembly instructions may include video instructions, audio instructions, image instructions, text-based instructions, or any combination thereof.

In some embodiments, server system 104 providing the nominal assembly instructions for the step to the actual operator may trigger monitoring platform 106 to record the actual operator performing the steps in the nominal assembly instructions. In some embodiments, the actual operator starting the nominal assembly instructions may trigger monitoring platform 106 to record the actual operator performing the steps in the nominal assembly instructions.

At step 516, server system 104 may receive audio and video data of the actual operator performing the step. For example, as discussed above, while the actual operator follows the nominal assembly instructions, monitoring platform 106 may capture audio and video data of the actual operator. Monitoring platform 106 may provide the audio and video data to server system 104 for analysis. In some embodiments, the audio and video data are sent from monitoring platform 106 to server system 104 in real-time or near real-time. In some embodiments, the audio and video data are sent from monitoring platform 106 to server system 104 periodically during recording of the actual operator.

At step 518, server system 104 may receive an indication that the actual operator has completed the step. In some embodiments, server system 104 may receive an indication that the actual operator has completed the step, responsive to the actual operator interacting with a complete graphical element displayed via computing system 101. In some embodiments, server system 104 may receive an indication that the actual operator has completed the step, responsive to analysis module 124 failing to sense movement of the actual operator in the audio and video data for a threshold amount of time. In some embodiments, server system 104 may receive an indication that the actual operator has completed the step based on the audio data. For example, the actual operator may utter a statement indicating completion of the step. NLP module 126 may convert the audio data to text, analyze the audio data, and determine that the actual operator has completed the step.

At step 520, server system 104 may prompt the actual operator to place the article of manufacture on the workspace. In some embodiments, server system 104 may prompt the actual operator by sending a message to computing system 101 for display to the actual operator. In some embodiments, the message may cause computing system 101 to virtually display a virtual boundary in which the actual operator should place the article of manufacture on the workspace. In some embodiments, server system 104 may instruct the actual operator to manipulate the article of manufacture, such that image data of the article of manufacture may be captured from a variety of angles.

At step 522, server system 104 may receive one or more images of the article of manufacture from monitoring platform 106. As indicated above, in some embodiments, the one or more images of the article of manufacture may include images of the article of manufacture from a variety of angles. In this manner, server system 104 may receive a more complete picture of the current state of the article of manufacture following the assembly step.

At step 524, server system 104 may save the received data for further analysis. For example, server system 104 may save one or more of the audio and video data of the actual operator and the one or more images of the article of manufacture for further analysis, such as that described above in conjunction with FIG. 1A.

Figure 6:
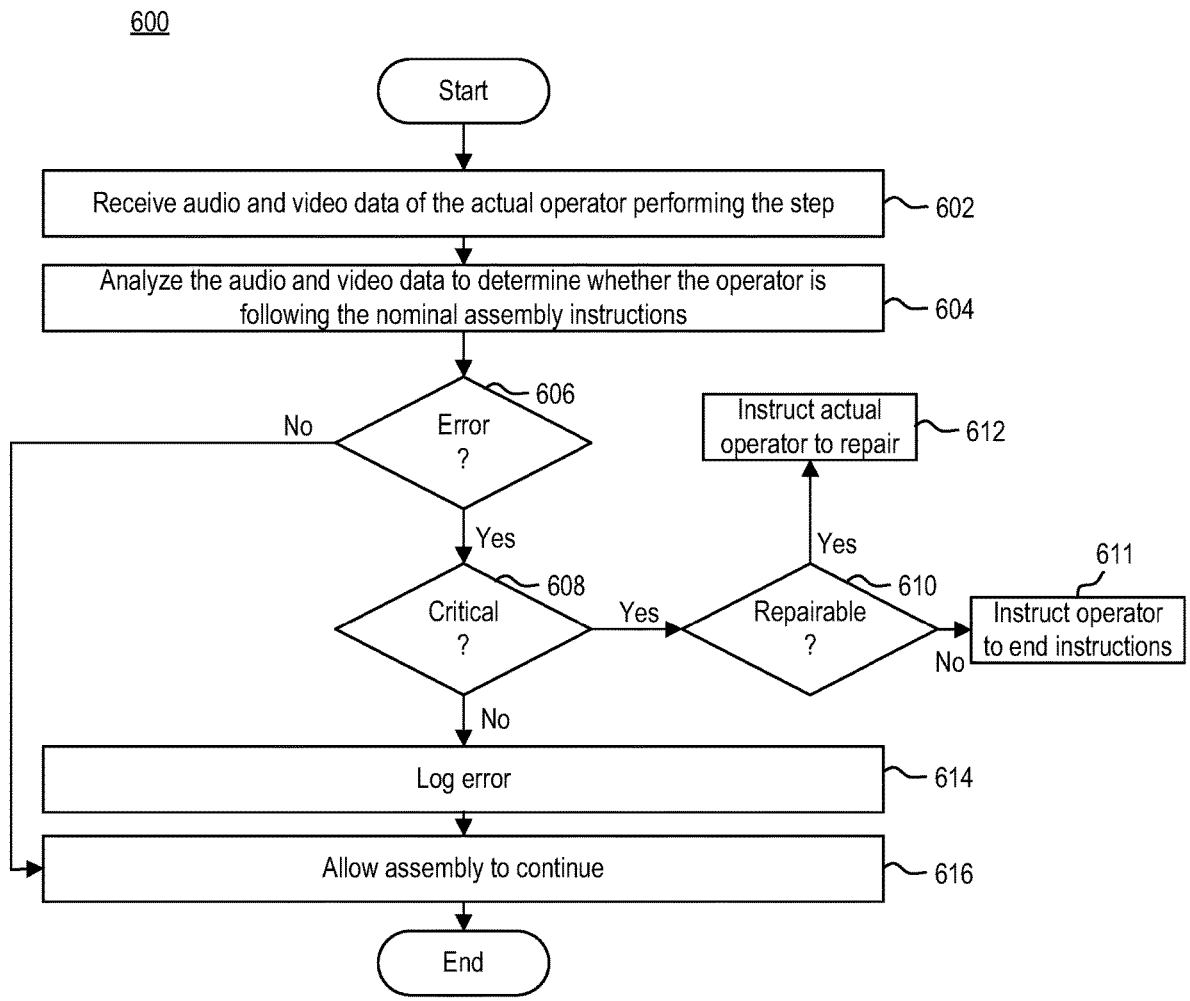
FIG. 6 is a flow diagram illustrating a method of analyzing an actual operator during an assembly step, according to example embodiments.

FIG. 6 is a flow diagram illustrating a method 600 of analyzing an actual operator during an assembly step, according to example embodiments. Method 600 may begin at step 602.

At step 602, server system 104 may receive from monitoring platform 106, audio and video data of the actual operator perform a step in the assembly process in accordance with the nominal assembly instructions. In some embodiments, server system 104 may receive the audio and video data of the actual operator in real-time or near real-time during the assembly process.

At step 604, server system 104 may analyze the audio and video data to determine whether the operator is following the nominal assembly instructions. For example, analysis module 124 may analyze the audio and video data to determine whether the actual operator used the correct tool with the correct part, combined the correct parts in the correct manner, and the like. In some embodiments, object detection module 122 may use object detection to identify whether the actual operator has the correct parts. In some embodiments, object detection module 122 may create a list of parts the actual assembler worked with during the step and the order in which they are used, along with their positions. In some embodiments, in addition to verifying that both the actual assembler and the nominal assembler are working with the same parts at the start of the step for every step, object detection module 122 and/or analysis module 124 may generate the order and position of use within step.

As those skilled in the art understand, the sequence of operations and component counts are important factors in determining how an actual assembler is performing. Analysis module 124 may include a machine learning model trained to detect deviations in this sequence. For example, the machine learning model may determine (1) what objects appear at what time; and (2) where do the objects end up going. If the machine learning model determines that what is detected differs from the nominal assembly instructions, the actual operator may be prompted. In some embodiments, analysis module 124 may utilize action recognition to classify different actions performed by both the actual operator and the nominal operator. Analysis module 124 may receive, store, and compare the sequence of events of the actual operator to the sequence of events of the nominal operator. If the sequence is deviates from the actual assembler's, sequence beyond a threshold amount, analysis module 124 may prompt the user to correct the assembly process.

At step 606, server system 104 may determine whether an error has occurred based on the analysis. In some embodiments, an error may refer to one or more of a misused component, a broken component, an incorrect component, an incorrect assembly of two or more components, and the like. Using a specific example, assume that a nominal operator A uses component A, two component Bs, and component C for step one. During this assembly step, components A, B, C all have specific starting positions. Such positions are recorded or otherwise noted by the system and verified as described in sub-step 416, discussed above. In a first step, two components B are attached to component A. Once this process is complete, component C may be attached to this subassembly. As can be seen, component B should be in place before component C is attached. Based on the nominal assembler's action, instructions module 121 has generated this sequence as part of the nominal assembly instructions. Turning to the actual operator's process, the actual operator is asked to place component A, two component Bs, and component C in their respective starting positions based on the positions the nominal assembler started with. If, for example, the actual operator accidentally starts working with component C and attaches component C to component A instead of two component Bs, analysis module 124 may detect that component C and component A are being worked on while component B is still not attached based on its last recorded position. Thus, analysis module 124 may conclude that component B is not where it was supposed to be, and, therefore, the task "attach two component Bs to component A" is not complete. In some embodiments, analysis module 124 may also verify that this step is incorrect since attaching component C to component A is not a step in the nominal assembly instructions.

If, at step 606, server system 104 determines that an error has not occurred, then method 600 may proceed to step 616. At step 616, server system 104 may allow assembly to continue. Server system 104 may continually monitor the actual operator until the step is complete.

If, however, at step 606, server system 104 determines that an error has occurred, then method 600 may proceed to step 608. At step 608, server system 104 may determine whether the error is a critical error. In some embodiments, a critical error may refer to an error that must be repaired before the actual operator is able to continue with the assembly. For example, a critical error may refer to an operator working on the wrong sequence of different parts. Continuing with the above example where the actual operator is instructed to attach two component Bs to component A, the relative order of which component B (e.g., left component B or right component B) is attached first may not be as critical as attaching both component Bs before attaching component C. While, attaching left component B before right component B may stray from the nominal assembly instructions, such deviation may be considered an error but may not be considered a critical error. In some embodiments, a critical error may be manually defined. For example, a nominal operator may define a critical error as using two components that should not be used together, such as using a liquid cleaning agent on electrical assemblies. In some embodiments, the nominal operator may describe component positionings where, for example, the nominal operator may define components and their relationships that object detection module 122 may monitor. In this example, object detection module 122 may ensure that when the two components (e.g., liquid cleaning agent and electrical assemblies) are brought close to each other, a critical error is generated, and the actual operator is notified of such error.

If, at step 608, server system 104 determines that the error is not a critical error, then method 500 may proceed to step

614. At step 614, server system 104 may log the error. The error log may be used by analysis module 124 and/or workflow optimization module 128 to evaluate the actual operator and/or reevaluate the nominal assembly instructions.

If, however, at step 608, server system 104 determines that the error is critical, then, method 600 may proceed to step 610. At step 610, server system 104 may prompt the actual operator to determine whether the error is repairable. For example, analysis module 124 may prompt the actual operator to check whether the error is repairable by going through a predefined checklist to make such determination.

If at step, 610, it is determined that the error is not repairable, then method 600 may proceed to step 611. At step 611, server system 104 may instruct the actual operator to end the assembly process. For example, server system 104 may send a message to be displayed via computing system 101 instruction the actual operator to cease operations.

If, however, at step 610, it is determined that the error is repairable, then method 600 may proceed to step 612. At step 612, server system 104 may instruct the actual operator to repair the article of manufacture. For example, based on the detected error, analysis module 124 may generate a step or series of steps to correct or account for the detected error. Analysis module 124 may work in conjunction with instructions module 121 for delivering the repair instructions to the actual operator via computing system 101.

Such process may continue until the assembly step is complete.

FIGS. 7A-7H illustrates one or more graphical user interfaces (GUIs) 700-770, according to example embodiments. GUIs 700-770 may be illustrative of GUIs corresponding to application 103 such as when a nominal operator interacts with application 103 to generate nominal assembly instructions.

Figure 7A:
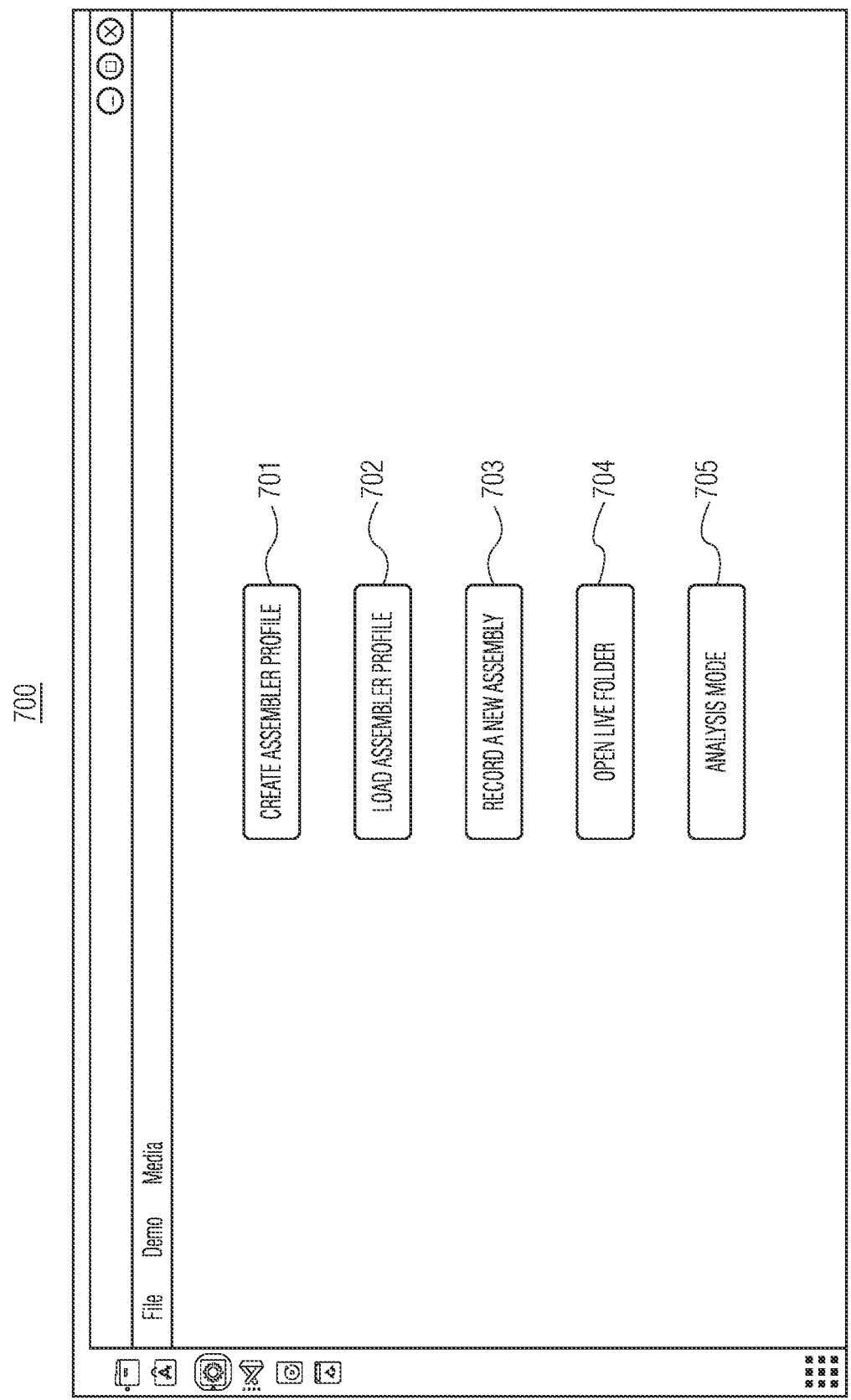
FIGS. 7A-7H illustrate one or more graphical user interfaces, according to example embodiments.

FIG. 7A illustrates GUI 700, according to example embodiments. As shown, when a nominal operator interacts with application 103, the nominal operator may be presented with a welcome page corresponding to GUI 700. As shown, GUI 700 may include graphical elements 701-705. Each of graphical element 701-705 may correspond to a different functionality of application 103.

In some embodiments, graphical element 701 may correspond to a create assembler profile. Via create assembler profile, a nominal operator or actual operator may create a profile. For nominal operators, the profile may allow the nominal operators to create assembly instructions for an assembly process. For actual operators, the profile may allow actual operators to keep track of their assembly statistics.

In some embodiments, graphical element 702 may correspond to a load assembler profile. For example, every assembler may create a profile that tracks what they have worked on, their quality of assembly, their expertise level with certain types of assemblies, and the like. In some embodiments, interaction with graphical element 702 may allow the assembler to upload their profile using this element.

In some embodiments, graphical element 703 may correspond to a record new assembly. A nominal operator may interact with graphical element 703 to record a new assembly or a new step in an assembly. This can be considered as "load the system in nominal assembly mode". For example, interaction with graphical element 703 may set up or initialize the system for generating nominal assembly instructions.

In some embodiments, graphical element 704 may correspond to an open live folder. This can be considered as "load the system in actual assembly mode". For example, interaction with graphical element 704 may set up or initialize the system for actual assembly and may prompt the actual assembler to open the assembly that they want to work on today.

In some embodiments, graphical element 705 may correspond to analysis mode. An actual operator may interact with graphical element 705 when performing a step in the assembly. Via assembly mode, the nominal operator may be presented with instructions for their assembly step.

Figure 7B:
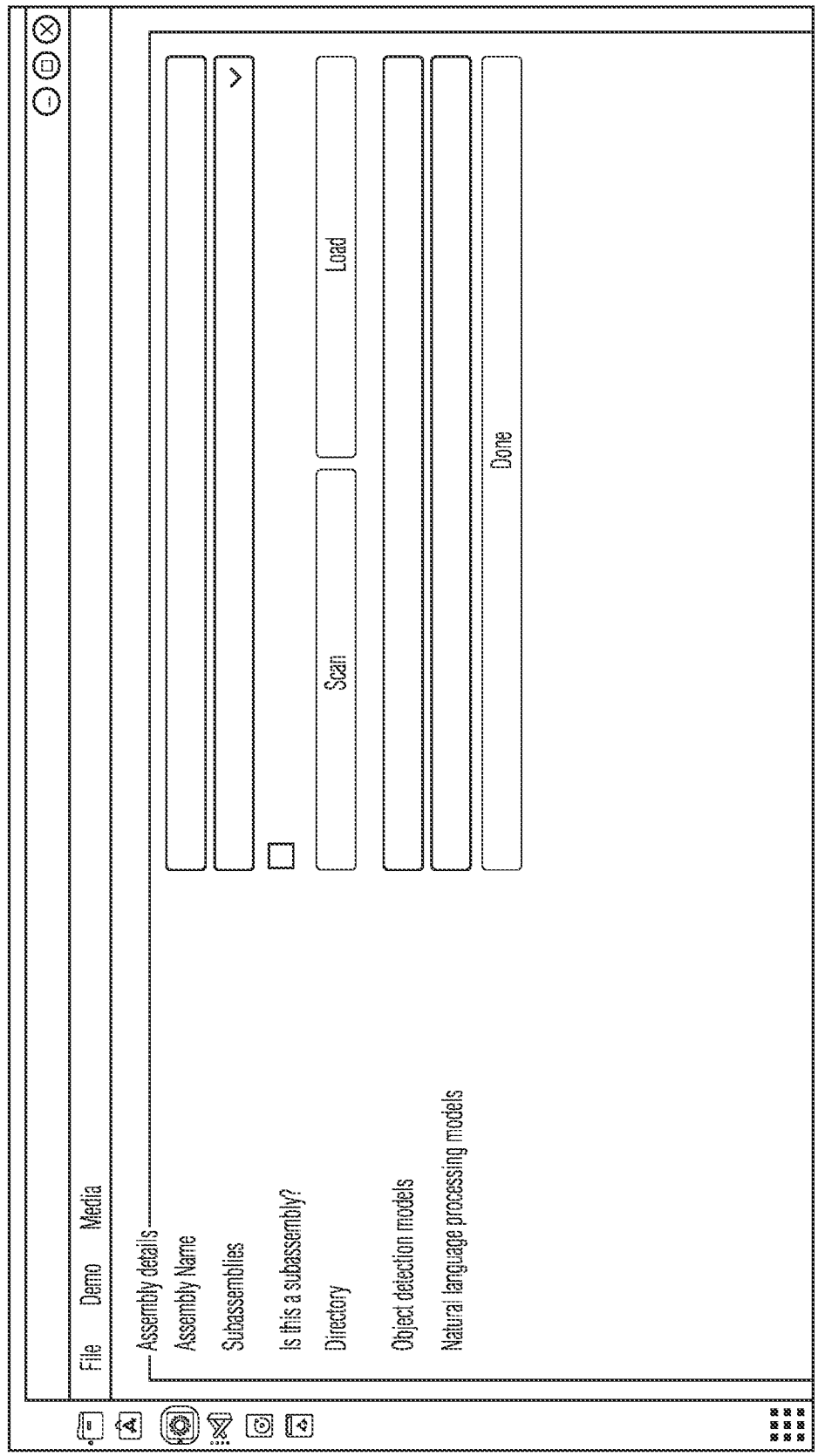

FIG. 7B illustrates GUI 710, according to example embodiments. As shown, when a nominal operator interacts with graphical element 703, the nominal operator may be presented with a series of GUIs, such as GUIs 710-770, for generating nominal assembly instructions for an assembly process or a step in the assembly process. As shown, GUI 700 includes one or more fields. Each field may define a parameter of the assembly process. For example, as shown, the fields may include: assembly name, subassemblies (e.g., an indication of whether the assembly includes one or more steps), an indication of whether the current assembly is a subassembly of an existing assembly, an indication of the components associated with the assembly process (e.g., the nominal operator can scan the components using object annotator 140 or upload already scanned components), an indication of the object detection models to be used, an indication of the NLP models to be used, or an indication of any other model to be used.

Figure 7C:
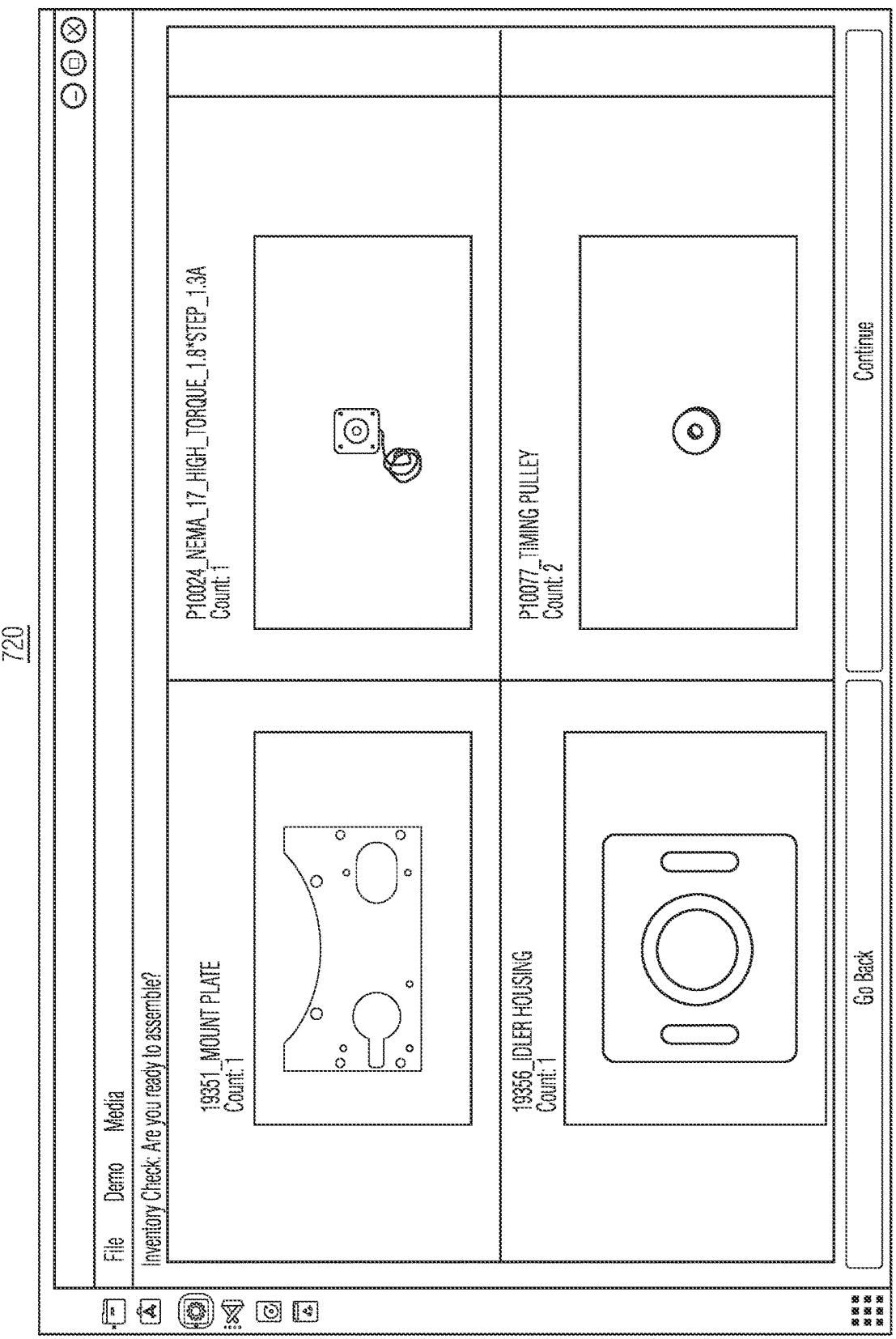

FIG. 7C illustrates GUI 720, according to example embodiments. As shown, GUI 720 may illustrate all components associated with the assembly process or step in the assembly process. Each component may have been scanned using object annotator 140. As shown, each component includes an image, a name, an identifier number, and/or a count of how many components are needed for the assembly process or step in the assembly process.

Figure 7D:
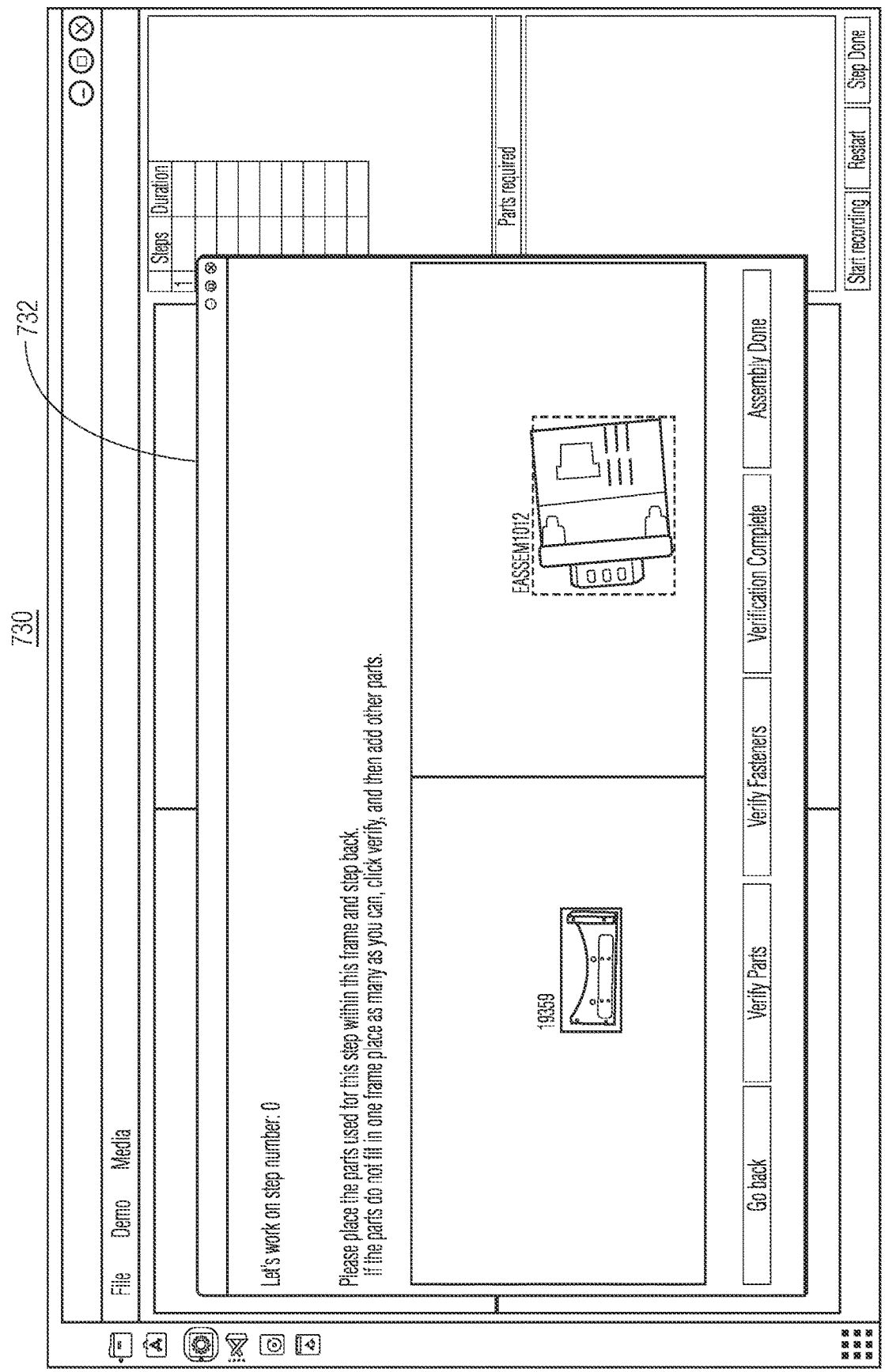

FIG. 7D illustrates GUI 730, according to example embodiments. GUI 730 may include a part verification window 732. Part verification window 732 may illustrate which components are needed for a given step in the assembly process. As shown, when the components are placed in a field of view of cameras 108, object detection module 122 may analyze the image data to identify and classify the components. In this manner, object detection module 122 may ensure that all components are accounted for before proceeding with the preparing the nominal assembly instructions.

Figure 7E:
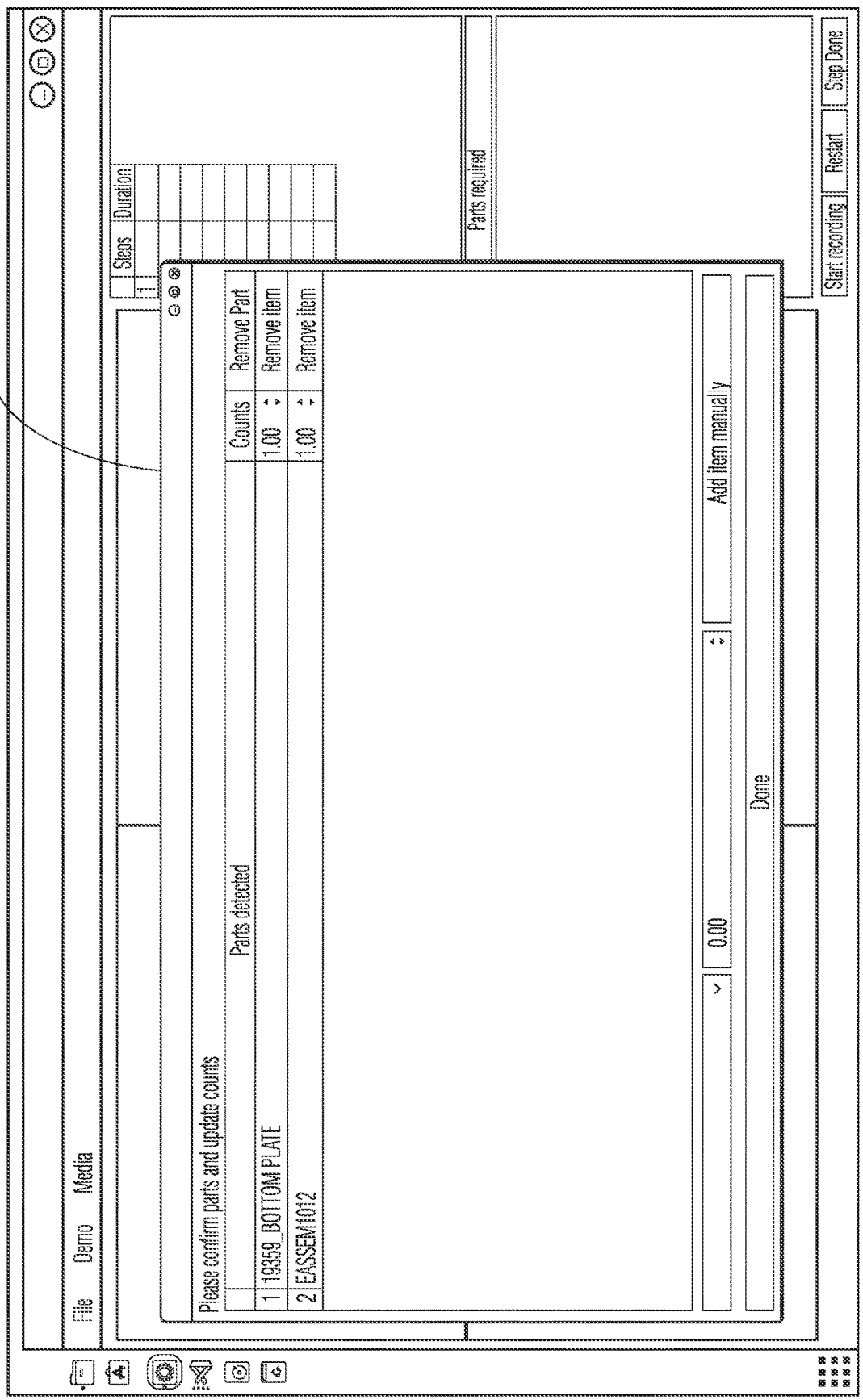

FIG. 7E illustrates GUI 740, according to example embodiments. GUI 740 may include a part verification window 742. Part verification window 742 may present a list of components that were detected by object detection module 122. In some embodiments, part verification window may also include a count of the number of each component identified.

Figure 7F:
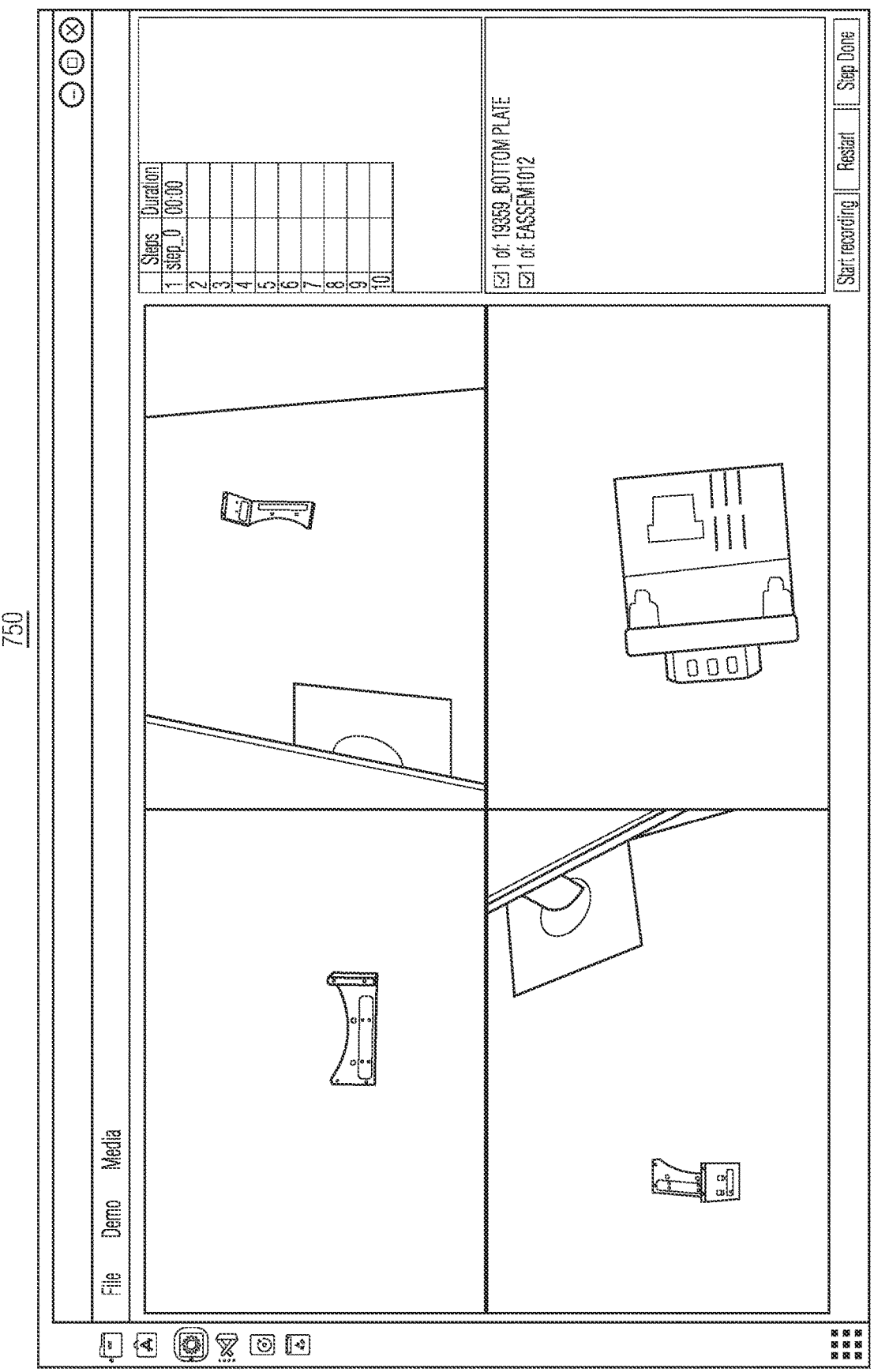

FIG. 7F illustrates GUI 750, according to example embodiments. GUI 750 may illustrate camera streams of the nominal operator. In some embodiments, GUI 750 may include a plurality of camera streams corresponding to a plurality of cameras 108 of monitoring platform 106. In some embodiments, GUI 750 may further include an indication of the current step and a duration it took the nominal operator to perform the current step.

Figure 7G:
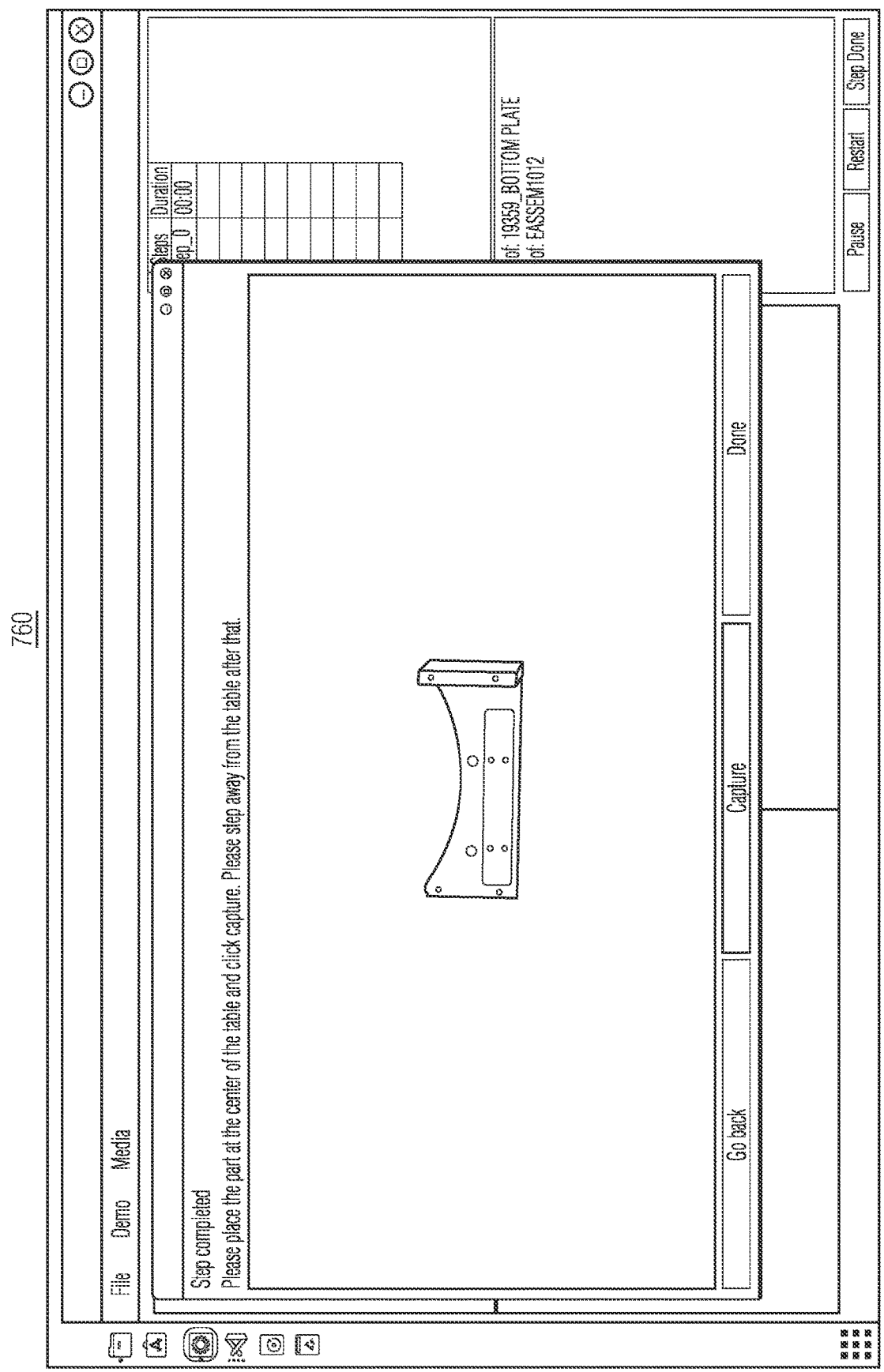

FIG. 7G illustrates GUI 760, according to example embodiments. GUI 760 may include a prompt that prompts the nominal operator to place the article of manufacture on the workspace in the field of view of cameras 108 once the step is complete. As shown, GUI 760 may include an image or live stream of the article of manufacture, as captured by cameras 108.

Figure 7H:
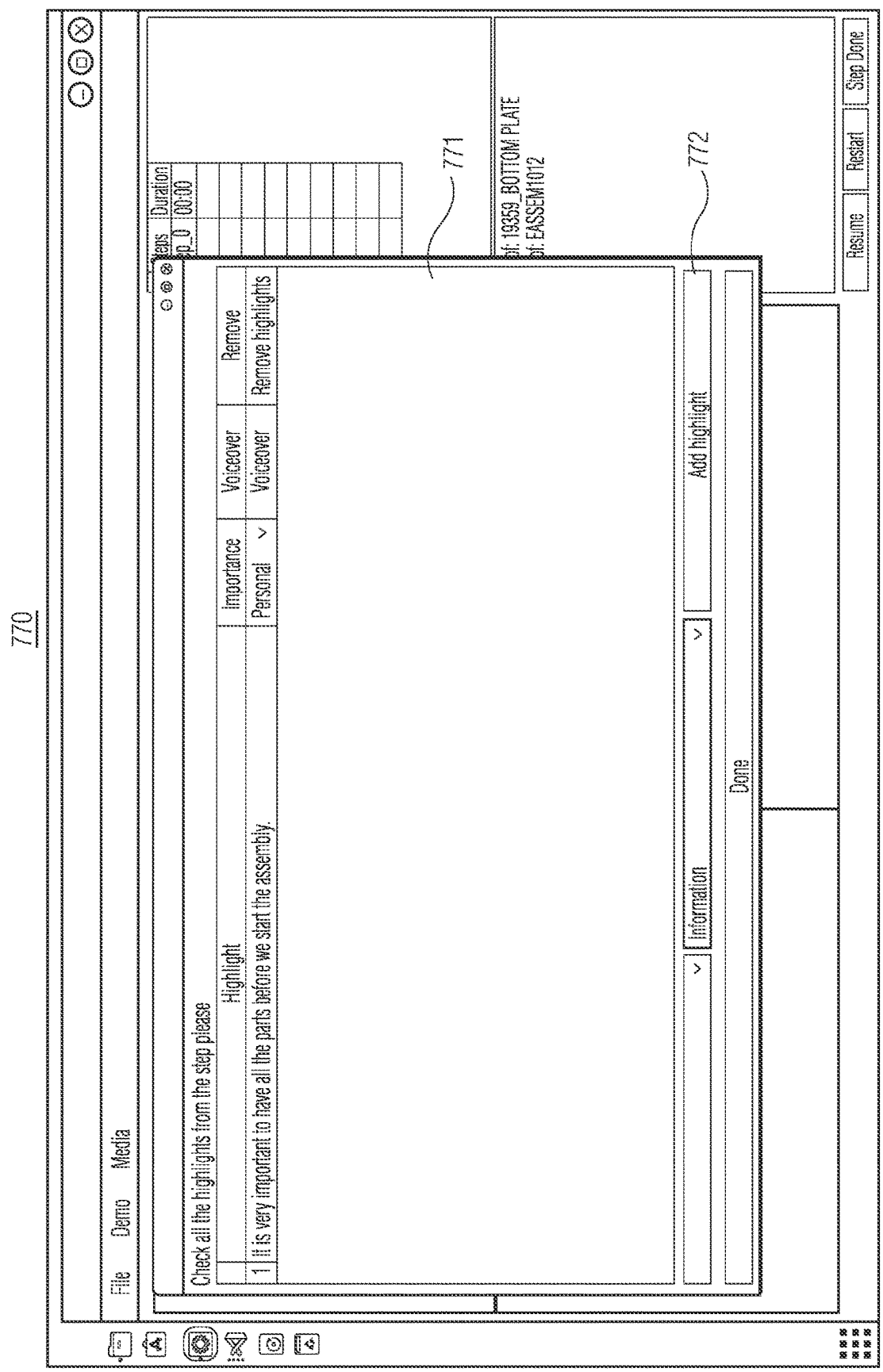

FIG. 7H illustrates GUI 770, according to example embodiments. GUI 770 may include a highlight preview window 771. Highlight preview window 771 may include highlights as determined by NLP module 126 and/or analysis module 124. As indicated above, highlights may be generated based on the audio data received from monitoring platform 106. The highlights may correspond to important prompts to be provided to the actual operator during assembly. In some embodiments, GUI 770 may allow a nominal operator to edit the highlight. For example, the nominal instructor can edit the highlights using a text edit function that allows the nominal instructor to type over the highlights shown to them. In some embodiments, GUI 770 may include a drop-down list next to the text of the highlight that allows a nominal operator to change the category of the highlight (e.g., assembler instruction, personal information, critical/warning, etc.). In some embodiments, highlight preview window 771 may also allow the nominal operator to delete a highlight.

In some embodiments, GUI 770 may include an option to manually add a highlight via field 772. In some embodiments, the highlights a user can manually add may include, but are not limited to, a sentence from the assembler's narration for the step, a highlight tag from a predefined list (e.g., assembler instruction, personal information, critical/warning), and the like.

FIGS. 8A-8E illustrate one or more graphical user interfaces (GUIs) 800-860, according to example embodiments. GUIs 800-860 may be illustrative of GUIs corresponding to application 103 such as when an actual operator interacts with application 103 to perform a step in an assembly process.

Figure 8A:
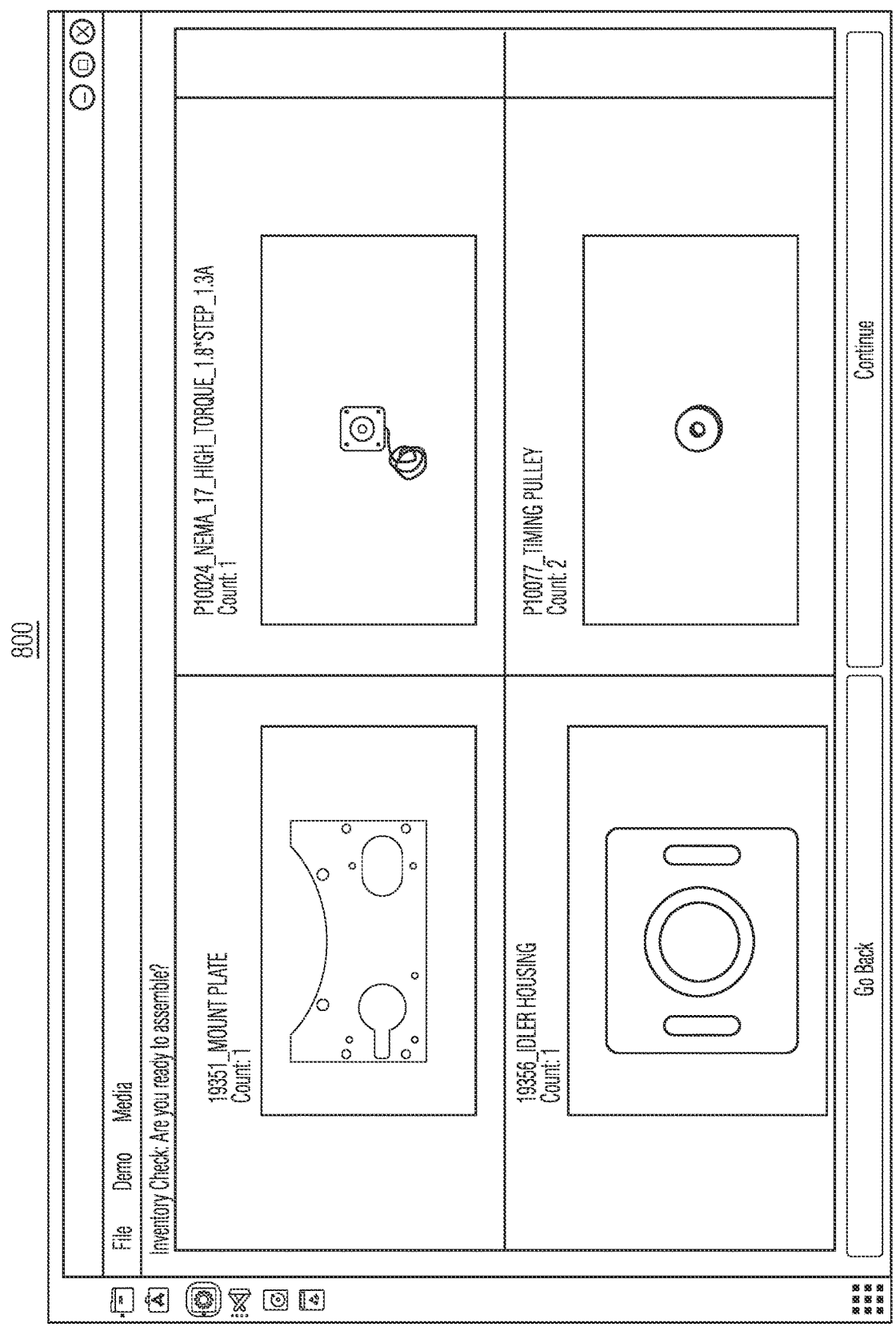
FIGS. 8A-8E illustrate one or more graphical user interfaces, according to example embodiments.

FIG. 8A illustrates GUI 800, according to example embodiments. In some embodiments, GUI 800 may correspond to an inventory check interface. For example, GUI 800 may include virtual bills of materials for each component required for the assembly process that the actual operator is about to perform.

Figure 8B:
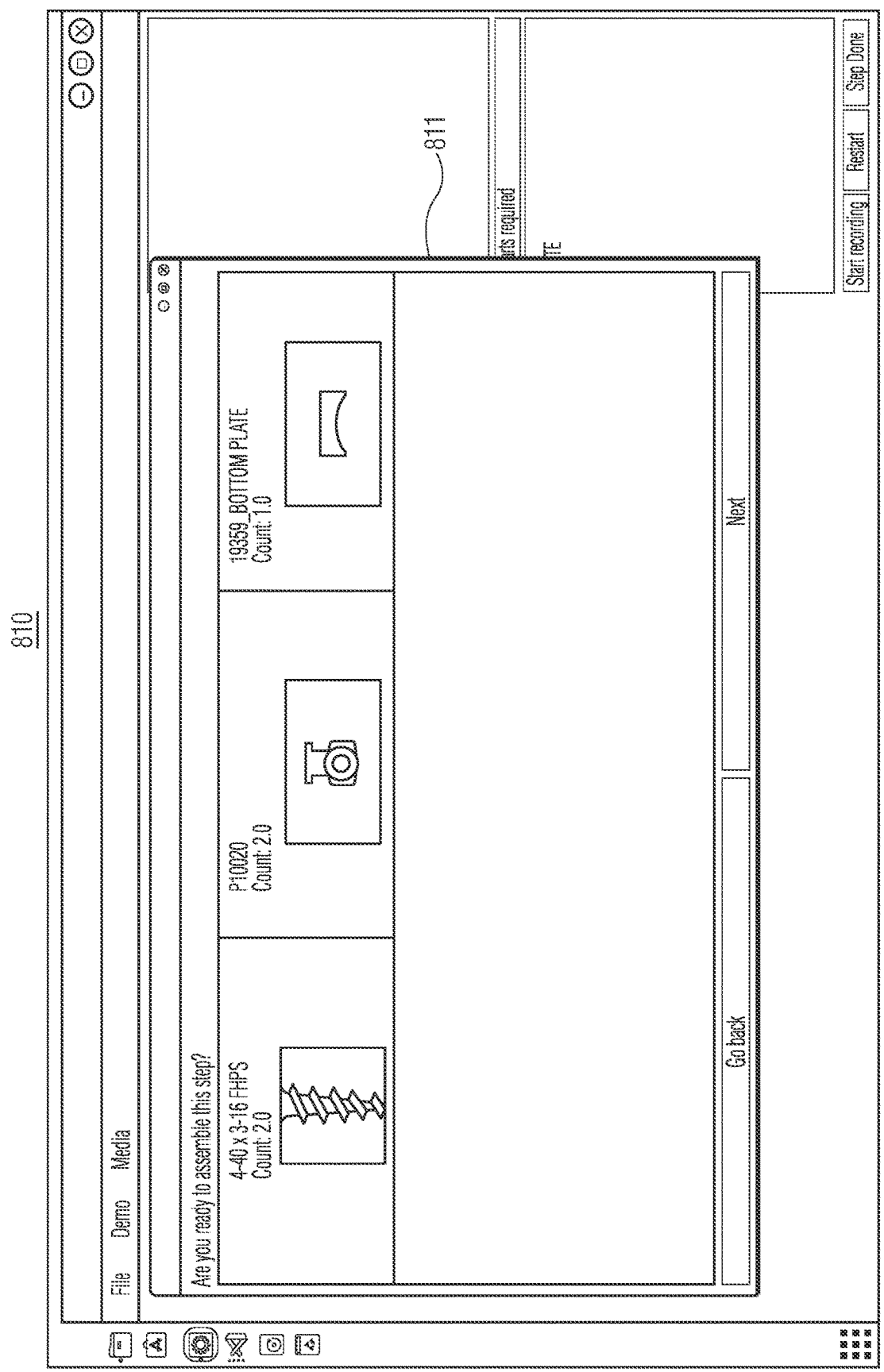

FIG. 8B illustrates GUI 810, according to example embodiments. In some embodiments, GUI 810 may correspond to an inventory check interface for a step in the assembly process. For example, GUI 810 may include an overlay window 811 that may illustrate virtual bills of materials for each component required for a given step in the assembly process that the actual operator is about to perform.

Figure 8C:
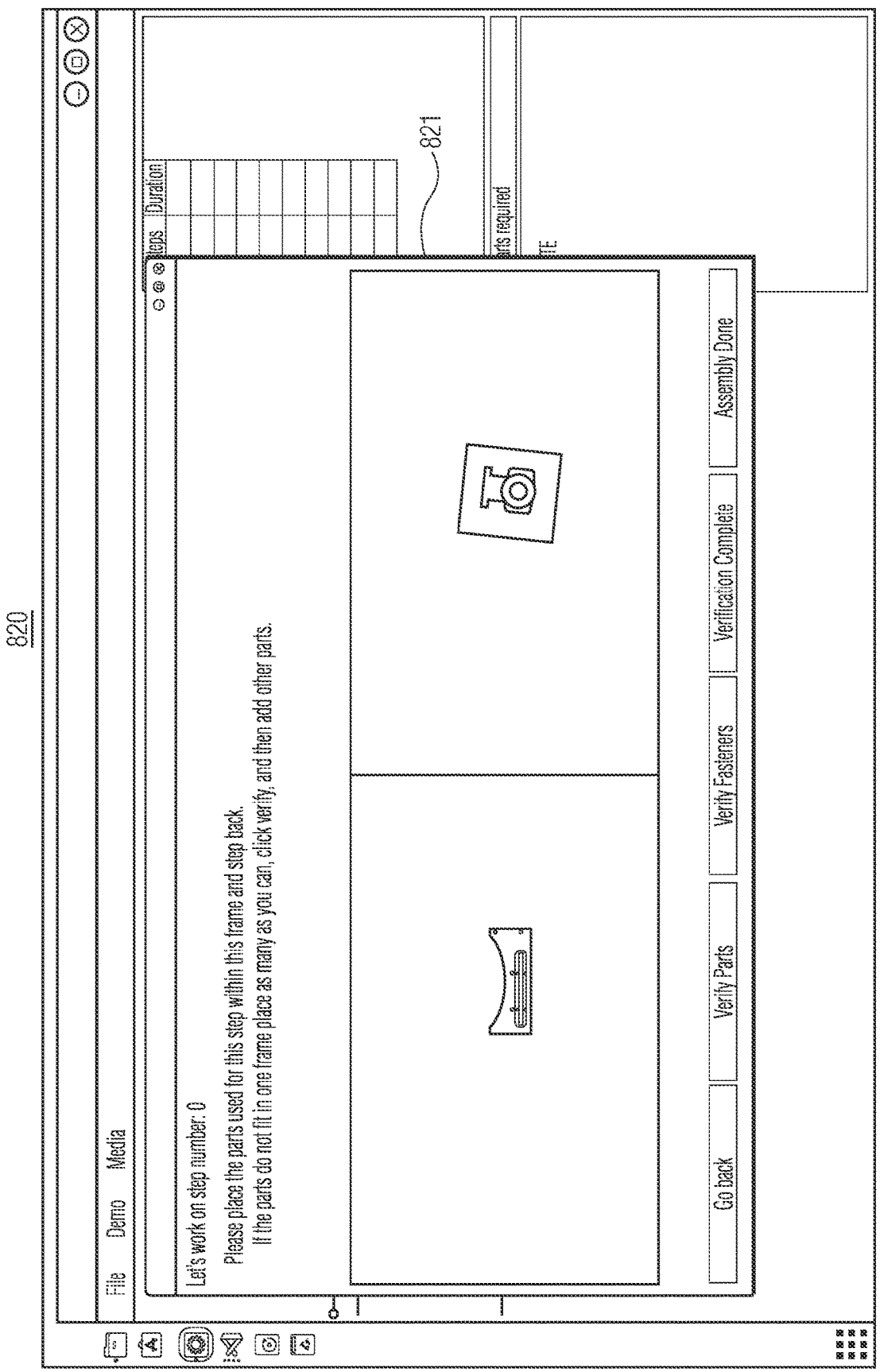

FIG. 8C illustrates GUI 820, according to example embodiments. In some embodiments, GUI 820 may include a prompt 821. Prompt 821 may instruct the actual operator to place each of the required components (e.g., those components shown in overlay window 811) on the workspace, in a field of view of cameras 108. In this manner, object detection module 122 and analysis module 124 may work in conjunction to ensure that the actual operator has selected all required components for this step in the assembly process.

Figure 8D:
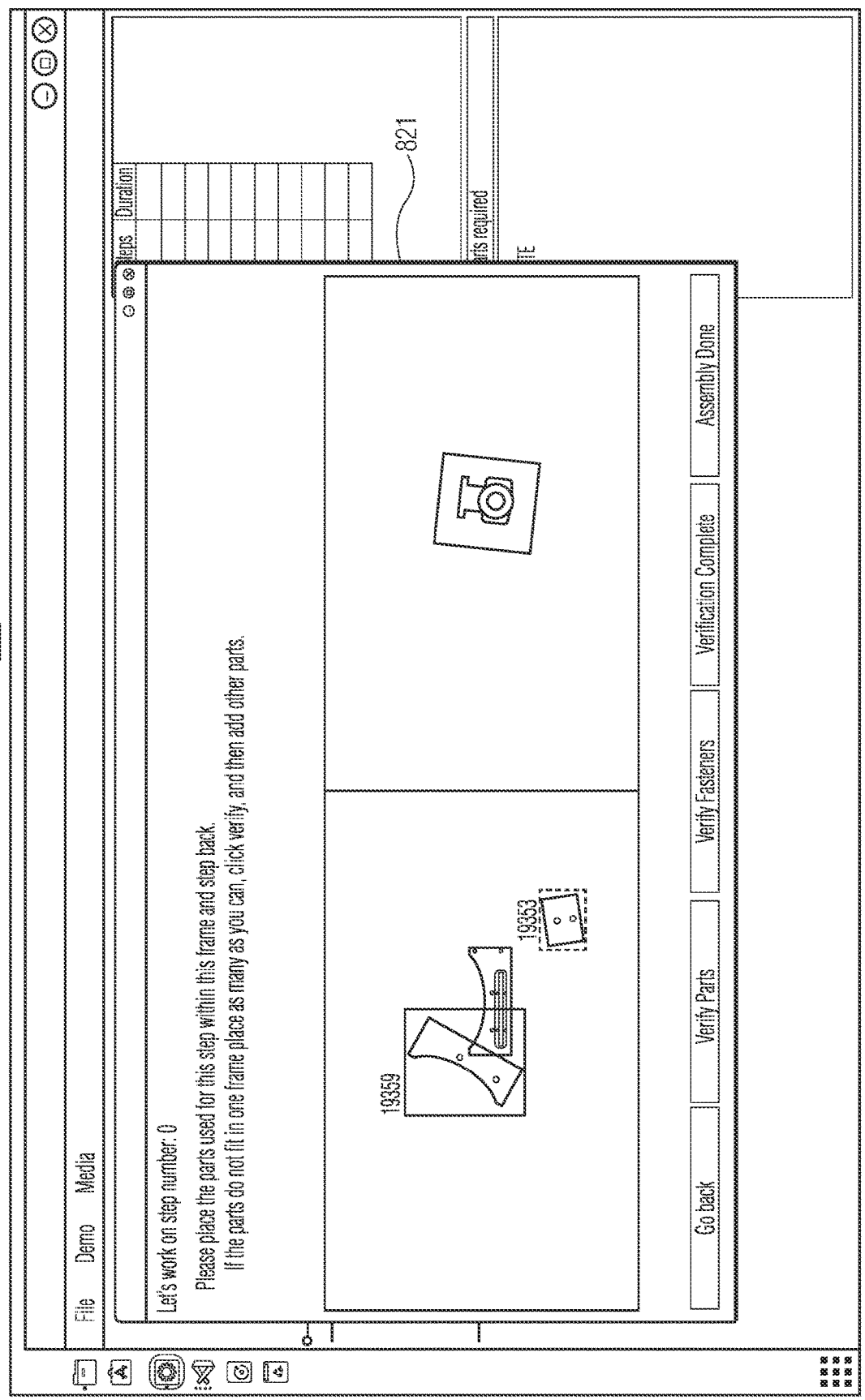

FIG. 8D illustrates GUI 820, according to example embodiments. As shown, following analysis by object detection module 122 and analysis module 124, GUI 820 may be updated to include indications of whether the components placed on the workspace are correct. As shown, component 19359 includes a green bounding box indicating that component 19359 is correct. Conversely, component 19353 includes a red bounding box indicating that component 19353 is incorrect.

Figure 8E:
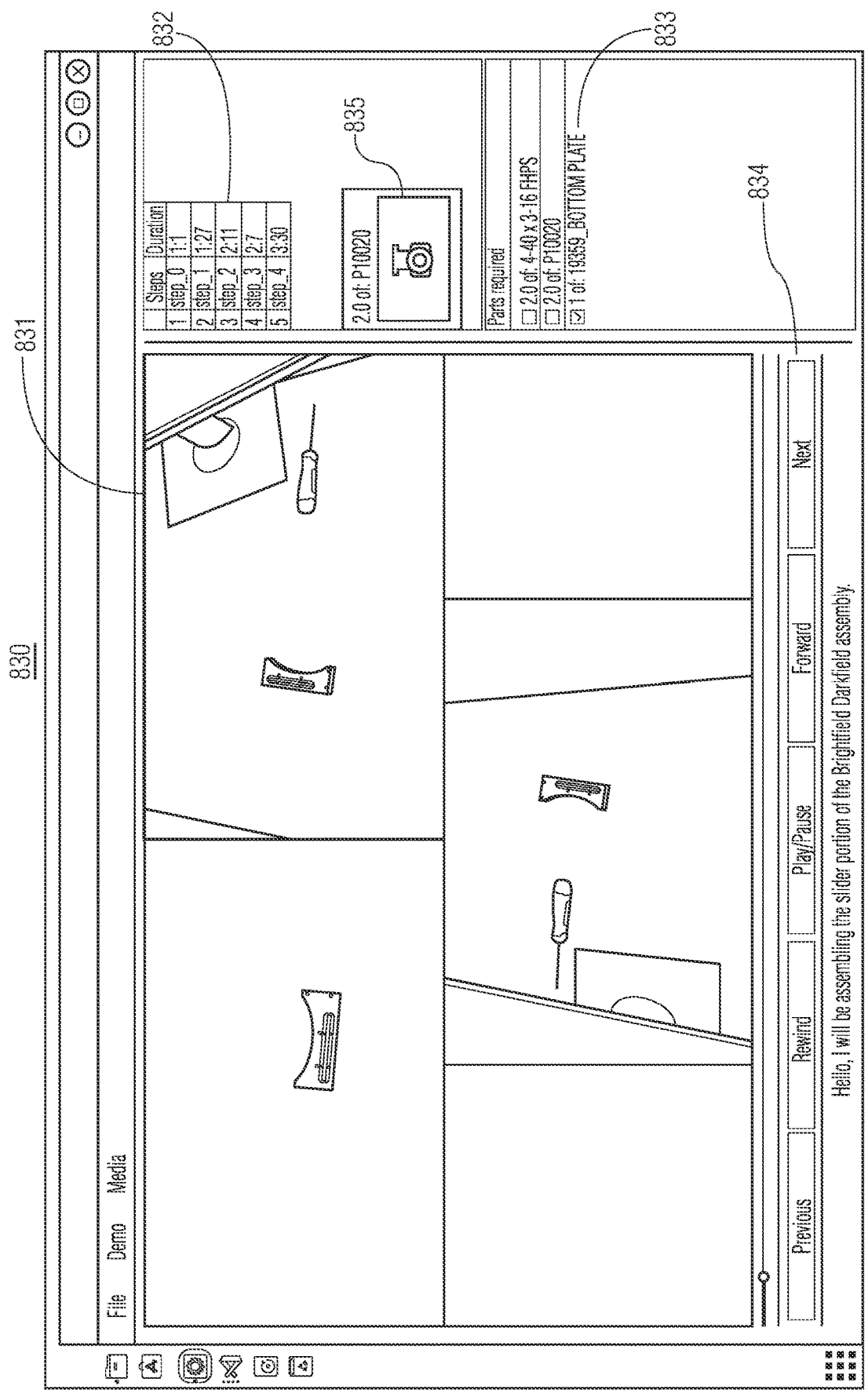

FIG. 8E illustrates GUI 830, according to example embodiments. GUI 830 may be presented when the actual operator begins the step in the assembly process. As shown, GUI 830 may include a video stream 831 corresponding to the actual operator performing the current step, a step list 832 listing the steps in the assembly process that the actual operator will perform, a parts list 833 for the current step, and highlights 834 for the current step, as defined by the nominal operator and/or monitoring and analytics platform 120. In some embodiments, components corresponding to the current step may be shown in component window 835.

Figure 9:
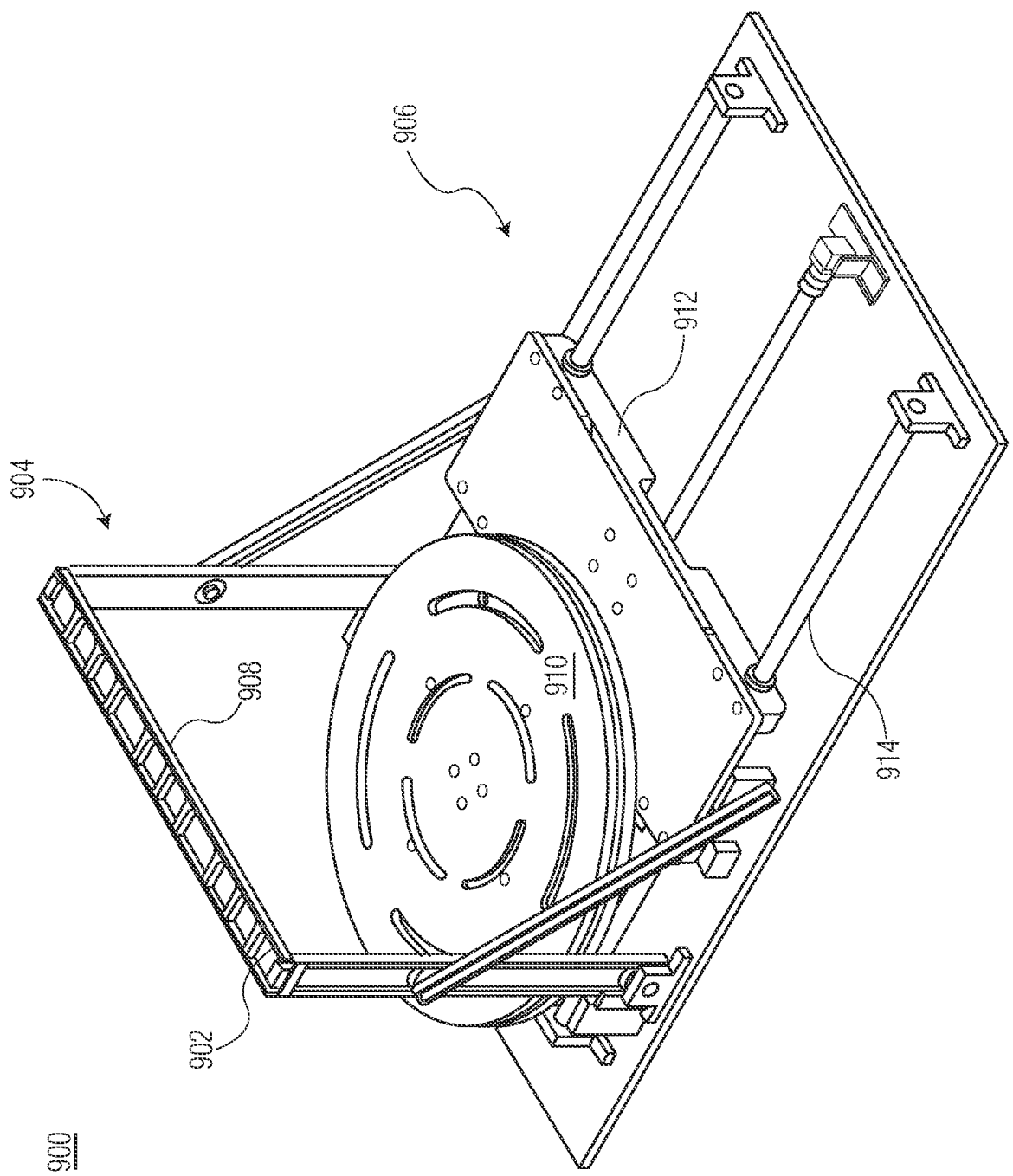
FIG. 9 illustrates an example object annotator, according to example embodiments.

FIG. 9 illustrates an example object annotator 900, according to example embodiments. Object annotator 900 may be representative of object annotator 140.

Object annotator 900 may include at least a camera 902. Camera 902 may be configured to capture images of a component from multiple angles and under multiple lighting conditions. As shown, in some embodiments, object annotator 900 may further include a moveable arm mechanism 904 and a support assembly 906.

Arm mechanism 904 may be configured to support a camera 902 and a plurality of lights 908. As shown, arm mechanism 904 may be configured to pivot between various angles. In this manner, camera 902 may be configured to capture images of a component at various angles under various lighting conditions.

Support assembly 906 may be configured to support a component being indexed. As shown, support assembly 906 may include a rotatable support plate 910 and a drive mechanism 912. Rotatable support plate 910 may be configured to support a component during indexing. In some embodiments, rotatable support plate 910 may be configured to rotate a full three-hundred-and-sixty degrees to allow camera 902 to capture a plurality of images of the component at various angles and under various lighting conditions.

Drive mechanism 912 may be configured to move rotatable support plate 910 in a linear direction. For example, as shown, drive mechanism may include support rods 914 that may allow drive mechanism 912 to move support plate 910 along a given axis.

As those skilled in the art understand, through movable arm mechanism 904, rotatable support plate 910, and drive mechanism 912, a nominal operator can generate a robust training set for training object detection model 210 to recognize or classify a component under various lighting conditions at various positions and at various angles.

In some embodiments, arm mechanism 904 and support assembly 906 may be connected to a microcontroller. The microcontroller may cause camera 902 and the component to move in different orientation and captures images of the component mounted on rotatable support plate 910. In some embodiments, the microcontroller may utilize a light controlling algorithm to detect the color diversity of the object along each plane. Light controlling algorithm may try to obtain images in a plurality of contrasting colors to get more details of the component's surface. If it is light controlling algorithm is unable to detect the color spread accurately, it may change the light gradually along the RGB spectrum and captures images at different intervals. The RGB information may also fed to an object subtracting and blending algorithm along with camera orientation. Using the information from the actual setup of the deployment place (general camera distance from object, average lighting condition, general camera orientation) multiple images may be generated from the captures and these are then fed to server system 104 for training machine learning model 212.

Figure 10:
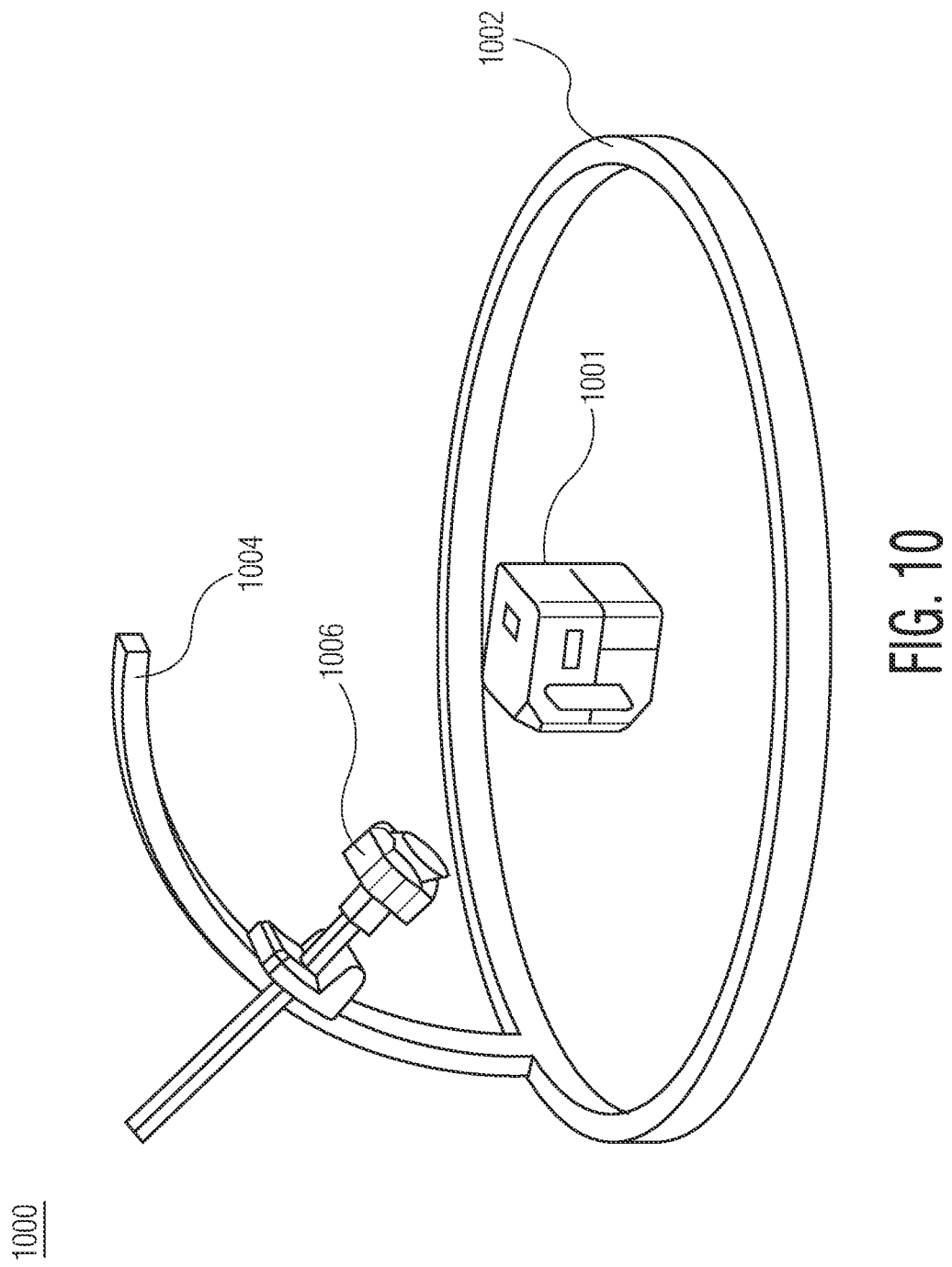
FIG. 10 illustrates an example object annotator, according to example embodiments.

FIG. 10 illustrates an example object annotator 1000, according to example embodiments. Object annotator 1000 may be representative of object annotator 140.

As shown, object annotator 1000 may include a base 1002 and an arm 1004 connected to based 1002. In some embodiments, arm 1004 may be curved. Object annotator 1000 may further include a camera 1006. Camera 1006 may be movably coupled with arm 1004. For example, as shown, camera 1006 may be movable along a length of a curvature of arm 1004, such that multiple images of a component 1001 under various lighting conditions can be captured.

Along with the image capturing and annotation, multiple other tasks can be performed using an object annotator, such as object annotator 140, object annotator 900, and/or object annotator 1000. In some embodiments, by using edge detection, object contours and lines can be detected in order to perform plane-based object segregation. Such functionality can further assist in tagging different faces/planes of an object to operation orientation-aware object detection. In some embodiments, with the use of any contrasting/reflecting object such as paint or reflective tape, planar boundaries on the object may be defined. Such process can be a very efficient way of tagging different objects/planes on a larger object. In some embodiments, using keypoint detection and other feature detectors, the object geometry other 3D features can be studied. With the help of structure from motion, the system can also 3D model the object (e.g., see Appendix). In some embodiments, using QR codes printed on the surface of the object, the labels for each object/plane can be fed to the pipeline directly. This would completely automate the annotation process, thus no longer requiring an operator to manually input parameters associated with the object or component being imaged. In some embodiments, with attachments such as LIDAR sensor, ultrasound sensor, infrared sensor, depth camera and other distance detecting modules, a finer 3D model of the component can be generated and tagged for 3D object detection. In some embodiments, a motion-guided camera can also be used to perform surface inspection and 3D inspection given true object details and drawings.

FIG. 11A illustrates an architecture of system bus computing system 1100, according to example embodiments. One or more components of system 1100 may be in electrical communication with each other using a bus 1105. System 1100 may include a processor (e.g., one or more CPUs, GPUs or other types of processors) 1110 and a system bus 1105 that couples various system components including the system memory 1115, such as read only memory (ROM) 1120 and random access memory (RAM) 1125, to processor 1110. System 1100 can include a cache of high-speed memory connected directly with, in close proximity to, or integrated as part of processor 1110. System 1100 can copy data from memory 1115 and/or storage device 1130 to cache 1112 for quick access by processor 1110. In this way, cache 1112 may provide a performance boost that avoids processor 1110 delays while waiting for data. These and other modules can control or be configured to control processor 1110 to perform various actions. Other system memory 1115 may be available for use as well. Memory 1115 may include multiple different types of memory with different performance characteristics. Processor 1110 may be representative of a single processor or multiple processors. Processor 1110 can include one or more of a general purpose processor or a hardware module or software module, such as service 1 1132, service 2 1134, and service 3 1136 stored in storage device 1130, configured to control processor 1110, as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction with the system 1100, an input device 1145 can be any number of input mechanisms, such as a microphone for speech, a touch-sensitive screen for gesture or graphical input, keyboard, mouse, motion input, speech, and so forth. An output device 1135 (e.g., a display) can also be one or more of a number of output mechanisms known to those of skill in the art. In some instances, multimodal systems can enable a user to provide multiple types of input to communicate with system 1100. Communication interface 1140 can generally govern and manage the user input and system output. There is no restriction on operating on any particular hardware arrangement and therefore the basic features here may easily be substituted for improved hardware or firmware arrangements as they are developed.

Storage device 1130 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 1125, read only memory (ROM) 1120, and hybrids thereof.

Storage device 1130 can include services 1132, 1134, and 1136 for controlling the processor 1110. Other hardware or software modules are contemplated. Storage device 1130 can be connected to system bus 1105. In one aspect, a hardware module that performs a particular function can include the software component stored in a computer-readable medium in connection with the necessary hardware components, such as processor 1110, bus 1105, output device 1135 (e.g., a display), and so forth, to carry out the function.

FIG. 11B illustrates a computer system 1150 having a chipset architecture, according to example embodiments. Computer system 1150 may be an example of computer hardware, software, and firmware that can be used to implement the disclosed technology. System 1150 can include one or more processors 1155, representative of any number of physically and/or logically distinct resources capable of executing software, firmware, and hardware configured to perform identified computations. One or more processors 1155 can communicate with a chipset 1160 that can control input to and output from one or more processors 1155. In this example, chipset 1160 outputs information to output 1165, such as a display, and can read and write information to storage device 1170, which can include magnetic media, and solid-state media, for example. Chipset 1160 can also read data from and write data to storage device 1175 (e.g., RAM). A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 1155 analyzing data stored in storage device 1170 or 1175. Further, the machine can receive inputs from a user through user interface components 1185 and execute appropriate functions, such as browsing functions by interpreting these inputs using one or more processors 1155.

It can be appreciated that example systems 1100 and 1150 can have more than one processor 1110 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

We claim:

1. A manufacturing system comprising:
   a monitoring platform configured to capture data of an operator during assembly of an article of manufacture, the monitoring platform comprising one or more cameras and one or more microphones; and
   an analytics platform in communication with the monitoring platform, the analytics platform configured to analyze the data captured by the monitoring platform, the analytics platform configured to perform operations comprising:
     receiving, from the monitoring platform, an indication of the operator performing a step in an assembly process for generating the article of manufacture;
     identifying components associated with the step in the assembly process;
     prompting the operator to place the components in a field of view of the one or more cameras of the monitoring platform;
     receiving, from the monitoring platform, image data corresponding to the components in the field of view of the one or more cameras;
     analyzing the image data to determine that the operator has selected all the components required for performing the step in the assembly process;
     responsive to determining that the operator has selected all the components required for the step in the assembly process, providing nominal assembly instructions to the operator;
     receiving real-time or near real-time video and audio data of the operator performing the step in the assembly process in accordance with the nominal assembly instructions;
     detecting an error in the assembly process based on the real-time or near real-time video and audio data of the operator performing the step of the assembly process; and
     based on the detecting, prompting the operator to repair the error.

2. The manufacturing system of claim 1, wherein the operations further comprise:
   responsive to determining that the operator has not selected all the components required for the step in the assembly process, instructing the operator to select a missing component and place the missing component in the field of view of the one or more cameras.

3. The manufacturing system of claim 1, wherein the operations further comprise:
   responsive to determining that the operator has selected an incorrect component, flagging the incorrect component and instructing the operator to remove the incorrect component and replace the incorrect component with a correct component.

4. The manufacturing system of claim 3, wherein flagging the incorrect component comprises:
   virtually annotating the incorrect component on a computing device accessible to the operator to flag the incorrect component.

5. The manufacturing system of claim 1, wherein detecting the error in the assembly process comprises:
   comparing the real-time or near real-time video or audio data of the operator to the nominal assembly instructions.

6. The manufacturing system of claim 1, wherein detecting the error in the assembly process based on the real-time or near real-time video and audio data of the operator performing the step of the assembly process comprises:
   determining whether the error is a critical error; and
   responsive to determining that the error is not a critical error, allowing the assembly process to continue.

7. The manufacturing system of claim 1, wherein detecting the error in the assembly process based on the real-time or near real-time video and audio data of the operator performing the step of the assembly process comprises:
   determining whether the error is a critical error;
   responsive to determining that the error is not a critical error, determining whether the error is repairable; and
   responsive to determining that the error is repairable, generating updated instructions for repairing the article of manufacture.

8. A method of performing an assembly process on an article of manufacture comprising:
   receiving, by a computing system from a monitoring platform, an indication of an operator performing a step in an assembly process for generating an article of manufacture;

identifying, by the computing system, components associated with the step in the assembly process;
prompting, by the computing system, the operator to place the components in a field of view of one or more cameras of the monitoring platform;
receiving, by the computing system from the monitoring platform, image data corresponding to the components in the field of view of the one or more cameras;
analyzing, by the computing system, the image data to determine that the operator has selected the components required for performing the step in the assembly process;
responsive to determining that the operator has selected the components required for performing the step in the assembly process, providing, by the computing system, nominal assembly instructions to the operator;
receiving, by the computing system, real-time or near real-time video and audio data of the operator performing the step in the assembly process in accordance with the nominal assembly instructions;
detecting, by the computing system, an error in the assembly process based on the real-time or near real-time video and audio data of the operator performing the step of the assembly process; and
based on the detecting, prompting, by the computing system, the operator to repair the error.

9. The method of claim 8, further comprising:
responsive to determining that the operator has not selected the components required for performing the step in the assembly process, instructing, by the computing system, the operator to select a missing component and place the missing component in the field of view of the one or more cameras.

10. The method of claim 8, further comprising:
responsive to determining that the operator has selected an incorrect component, flagging, by the computing system, the incorrect component and instructing the operator to remove the incorrect component and replace the incorrect component with a correct component.

11. The method of claim 10, further comprising, wherein flagging, by the computing system, the incorrect component comprises:
virtually annotating the incorrect component on a computing device accessible to the operator to flag the incorrect component.

12. The method of claim 8, wherein detecting, by the computing system, the error in the assembly process comprises:
comparing the real-time or near real-time video or audio data of the operator to the nominal assembly instructions.

13. The method of claim 8, wherein detecting, by the computing system, the error in the assembly process based on the real-time or near real-time video and audio data of the operator performing the step of the assembly process comprises:
determining whether the error is a critical error; and
responsive to determining that the error is not a critical error, allowing the assembly process to continue.

14. The method of claim 8, wherein detecting, by the computing system, the error in the assembly process based on the real-time or near real-time video and audio data of the operator performing the step of the assembly process comprises:
determining whether the error is a critical error;
responsive to determining that the error is not a critical error, determining whether the error is repairable; and
responsive to determining that the error is repairable, generating updated instructions for repairing the article of manufacture.

15. A non-transitory computer readable medium comprising one or more sequences of instructions, which, when executed by a processor, causes a computing system to perform operations comprising:
identifying, by the computing system, components associated with a step in an assembly process for generating an article of manufacture;
prompting, by the computing system, an operator to place the components in a field of view of one or more cameras of a monitoring platform;
receiving, by the computing system from the monitoring platform, image data corresponding to the components in the field of view of the one or more cameras;
analyzing, by the computing system, the image data to determine that the operator has selected the components required for performing the step in the assembly process;
responsive to determining that the operator has selected the components required for performing the step in the assembly process, providing, by the computing system, nominal assembly instructions to the operator;
receiving, by the computing system, real-time or near real-time video and audio data of the operator performing the step in the assembly process in accordance with the nominal assembly instructions;
detecting, by the computing system, an error in the assembly process based on the real-time or near real-time video and audio data of the operator performing the step of the assembly process; and
based on the detecting, prompting, by the computing system, the operator to repair the error.

16. The non-transitory computer readable medium of claim 15, further comprising:
responsive to determining that the operator has not selected the components required for performing the step in the assembly process, instructing, by the computing system, the operator to select a missing component and place the missing component in the field of view of the one or more cameras.

17. The non-transitory computer readable medium of claim 15, further comprising:
responsive to determining that the operator has selected an incorrect component, flagging, by the computing system, the incorrect component and instructing the operator to remove the incorrect component and replace the incorrect component with a correct component.

18. The non-transitory computer readable medium of claim 17, further comprising, wherein flagging, by the computing system, the incorrect component comprises:
virtually annotating the incorrect component on a computing device accessible to the operator to flag the incorrect component.

19. The non-transitory computer readable medium of claim 15, wherein detecting, by the computing system, the error in the assembly process comprises:
comparing the real-time or near real-time video or audio data of the operator to the nominal assembly instructions.

20. The non-transitory computer readable medium of claim 15, wherein detecting, by the computing system, the error in the assembly process based on the real-time or near real-time video and audio data of the operator performing the step of the assembly process comprises:
  determining whether the error is a critical error;
  responsive to determining that the error is not a critical error, allowing the assembly process to continue;
  responsive to determining that the error is not a critical error, determining whether the error is repairable; and
  responsive to determining that the error is repairable, generating updated instructions for repairing the article of manufacture.

\* \* \* \* \*